United States Patent [19]

Lavendel

[11] Patent Number: 5,615,320
[45] Date of Patent: Mar. 25, 1997

[54] COMPUTER-AIDED COLOR SELECTION AND COLORIZING SYSTEM USING OBJECTIVE-BASED COLORING CRITERIA

[75] Inventor: Laurence A. Lavendel, Aptos, Calif.

[73] Assignee: Canon Information Systems, Inc., Costa Mesa, Calif.

[21] Appl. No.: 231,911

[22] Filed: Apr. 25, 1994

[51] Int. Cl.⁶ .................................................. G09G 1/28
[52] U.S. Cl. ........................................ 395/131; 395/326
[58] Field of Search .................................. 395/131, 161, 395/155

[56] References Cited

U.S. PATENT DOCUMENTS

| | | | |
|---|---|---|---|
| 3,548,806 | 12/1970 | Fisher | 128/2.05 |
| 3,691,652 | 9/1972 | Clynes | 35/22 |
| 4,184,344 | 1/1980 | Pepin | 63/31 |
| 4,337,046 | 6/1982 | Anderson et al. | 434/103 |
| 4,397,635 | 8/1983 | Samuels | 434/178 |
| 4,777,937 | 10/1988 | Rush et al. | 600/27 |
| 4,862,408 | 8/1989 | Zamora | 364/900 |

(List continued on next page.)

FOREIGN PATENT DOCUMENTS

| | | |
|---|---|---|
| 2079534 | 4/1993 | Canada . |
| 0333475 | 9/1989 | European Pat. Off. . |
| 0528599 | 2/1993 | European Pat. Off. . |
| 0546773 | 6/1993 | European Pat. Off. . |
| 0576846 | 1/1994 | European Pat. Off. . |
| 2681967 | 9/1992 | France . |
| 52-80043 | 7/1977 | Japan . |

OTHER PUBLICATIONS

Cowart, (*Mastering Windows 3.1*, Sybex, 1992, 1993) pp. 151–156.
Nakanishi et al "Color Planning by Fuzzy Set Theory", Fuzzy Systems, Int'l Conference 1992, pp. 5–11.
"Color Palette Selection Tools", G.B. Beretta, Advanced Printing Of Conference Summaries, SPSE's 43rd Annual Conference, pp. 94–96 (May 1990).
"Color Management, Matching and Output Quality Dominate Seybold Show Floor and Conference Debates", Greg Porell, Trade Review, Apr. 28, 1993, pp. 1–7.
"Caere's Image Assistant Lets You Choose The Right Interface", Jon Pepper, PC Computing, Dec. 1992.
"Caere Corporation Expands Produce Line, Enters New Markets", Press Release, Caere Corporation (Sep. 23, 1992).
"Script For Video Film 'Color Selection'", 2nd ed., G. Beretta, et al., Xerox Corporation, pp. 1–6 (from 1990 Sigchi Conference On Human Factors In Computer Systems).
"Microsoft Power–Point Version 4.0" User's Guide, pp. 23–24 and 32–33.
"Borland Quattro Pro For Windows Version 5.0" User's Guide, pp. 203, 272–280, 289–292 and 515 (1991).
"ACE: A Color Expert System For User Interface Design", Proceedings Of The ACM Siggraph Symposium On User Interface Software, Oct. 17–19, 1988, pp. 117–128.

*Primary Examiner*—Heather R. Herndon
*Assistant Examiner*—Cliff N. Vo
*Attorney, Agent, or Firm*—Fitzpatrick, Cella, Harper & Scinto

[57] ABSTRACT

A computer-implemented system for selecting a color scheme and colorizing a document with the selected color scheme includes displaying a menu of user-selectable objectives which are used to define a color scheme, accessing a computerized color knowledge-base system in accordance with the selected objectives to select the color scheme, and displaying the selected color scheme. Once the color scheme has been selected, the document can be colorized by retrieving the document from a file such as that created by a desktop publishing program, selecting a page of the document image to be colorized, and colorizing a plurality of reproductions of the selected page. The plurality of reproduced pages are variably colorized with combinations of colors from the selected color scheme. A user selects the most desirably colorized page reproduction and the selected colorized page is re-displayed for further processing.

31 Claims, 18 Drawing Sheets

U.S. PATENT DOCUMENTS

| | | | |
|---|---|---|---|
| 4,894,665 | 1/1990 | Davis | 346/1.1 |
| 4,907,075 | 3/1990 | Braudaway | 358/75 |
| 5,025,249 | 6/1991 | Seiler et al. | 340/721 |
| 5,025,282 | 6/1991 | Nakamura et al. | 355/38 |
| 5,038,300 | 8/1991 | Seiler et al. | 364/521 |
| 5,049,986 | 9/1991 | Aono et al. | 358/80 |
| 5,053,866 | 10/1991 | Johnson | 358/75 |
| 5,093,717 | 3/1992 | Sandrew | 358/81 |
| 5,103,407 | 4/1992 | Gabor | 395/131 |
| 5,113,356 | 5/1992 | Nickell et al. | 395/108 |
| 5,121,196 | 6/1992 | Hung | 358/75 |
| 5,146,346 | 9/1992 | Knoll | 358/298 |
| 5,179,653 | 1/1993 | Fuller | 395/156 |
| 5,182,793 | 1/1993 | Alexander et al. | 395/13 |
| 5,185,850 | 2/1993 | Usui et al. | 395/22 |
| 5,208,903 | 5/1993 | Curry | 395/131 |
| 5,209,664 | 5/1993 | Wilcox | 434/103 |
| 5,222,154 | 6/1993 | Graham et al. | 382/18 |
| 5,222,206 | 6/1993 | Liao | 395/131 |
| 5,247,651 | 9/1993 | Clarisse | 395/500 |
| 5,249,263 | 9/1993 | Yanker | 395/131 |
| 5,257,242 | 10/1993 | Clawson | 367/38 |
| 5,311,212 | 4/1994 | Beretta | 345/150 |
| 5,367,633 | 11/1994 | Matheny et al. | 395/164 |
| 5,412,577 | 5/1995 | Sainio et al. | 364/469 |

COMPUTER-AIDED COLOR SELECTION AND COLORIZING SYSTEM USING OBJECTIVE-BASED COLORING CRITERIA

BACKGROUND OF THE INVENTION

1. Field of the Invention

The present invention relates to a computer-aided color selection and document colorizing system.

2. Description of the Related Art

Recently-developed coloring programs provide the computer operator with tools to help in coloring documents. For example, such coloring programs as ColorUP or Power Point provide "canned" color schemes which include static sets of color palettes so as to be useful for a wide range of document coloring tasks. However, color professionals, such as designers and artists, tend to base color decisions on goals and constraints of a job on which they are working. Therefore, "canned" color palettes may not contain the appropriate colors for a particular task. Furthermore, these coloring programs are difficult to use. As a specific example, since the coloring programs do not have a universally compatible interface with other applications, the user not only has to determine appropriate colors, but also has to change the software interface path of the coloring program in order to explicitly import the features of the coloring program into another application, such as a text-editor application. As a result, a color professional, who is proficient at making good color selections but who may not be proficient in computer operations, finds conventional coloring programs cumbersome and complicated.

Currently, there are no known programs which make recommendations as to an appropriate color scheme for a specific objective. For example, no conventional coloring program is known which provides the user with advice as to a color scheme which most appropriately portrays a user's color impact objectives, such as colors which are explicitly suited for a particular audience or which convey a particular mood or message. Moreover, no conventional coloring application automatically selects colors and organizes them into a color palette in such a way as to provide flexible and intuitive guidance on how the colors should be used and how each selected color relates to the other.

Heretofore, computer-aided color advice has not been available to assist the professional and novice user in selecting a color scheme for inclusion in a document or graphical image, based on the user's objectives. Moreover, no coloring program currently provides a colorizer which provides advice as to how to apply a generated color scheme to a document composition by rapidly generating and displaying thumbnail sketches of the user's documents that have been automatically colorized in various colors using the generated color scheme. As a result, both the professional color user and the novice color user are confronted with the problem of using coloring programs which offer color schemes which may be unsuitable to satisfy a particular coloring goal.

SUMMARY OF THE INVENTION

The present invention addresses the above-mentioned drawbacks by providing a color utility system which utilizes a computer-aided process designed to be used in connection with other computer processes such as a page layout, paint, or drawing programs and which provides advanced color capabilities for selecting appropriate color schemes to be used in the document creation process.

The present invention provides the feature of a computer-aided color selection system for selecting a palette of colors based on user-selected color impact objective criteria that describe the document in terms of the user's goals, for example, the intended emotional tone, style and attitude that it is desired for the document to convey or the audience, occasion and style for the document, and the like. Color schemes generated in this manner are organized into a palette in such a way as to make it intuitively evident how each color is to be used in the composition of the document.

In the present invention, a color selection system selects one color to be a dominant color in the document composition. The color selection system also selects colors which have a lesser impact in the document design so as to coexist with the dominant color. Based on these selected dominant and coexisting colors, a number of other colors are calculated to be supporting colors. These are colors that have a similar hue to one of the dominant or coexisting colors but which differ mainly in saturation and lightness. In addition to the dominant, coexisting, and respective supporting colors, there are provided by the color selection system a set of highly saturated highlight colors, black and white, and gray colors, and, at the discretion of the user, a variety of data colors.

Another feature of the computer-aided color selection system is the ability to modify individual colors in the scheme by using a variety of conventional color tuners or choosers. In relation to this, one feature of the color selection system is the ability of chaining together related colors. That is, links can be established between the dominant color and its supporting colors and, similarly, between any of the coexisting colors and their related supporting colors. The purpose of chaining colors is to allow the user to modify one color in the chain and have the color selection system modify the others in the chain so that all of the chained colors maintain the same chromatic relationships to each other.

Accordingly, in this aspect of the present invention there is a computer-aided method and an apparatus for selecting a color scheme. The method and apparatus include retrieving stored user-selectable color impact objectives which are used to define a color scheme, accessing a computerized color knowledge-based system of colors in accordance with the user-selectable color impact objectives for selecting the color scheme, and displaying the selected color scheme.

In another aspect of the present invention there is provided a colorizer for automatically displaying a plurality of thumbnail sketches of a document page that are variably colorized abstractions of the document page obtained by using the colors defined in the current color scheme. The method and apparatus include retrieving a user-selected document from a computer file and reproducing pages in that document in a reduced abstracted "thumbnail" form. In other words, the thumbnail sketches are generally of a smaller-size abstract view of the document page. Each of these thumbnails is colored differently using only the colors in the previously created color scheme. The variety of colored thumbnail pages are automatically generated by the program and presented to the operator for selection and further work. The user will be able to sequentially select any page in the document to be viewed and colorized in this way.

In another aspect of the invention, there is a method and an apparatus for logging and maintaining a color diary, which can be used to skew color scheme selections using a terminate-and-stay-resident color agent. This color agent tracks all of the color work being done on a particular computer system. The purpose of the color agent is to recognize and record color usage patterns, and to provide a profile of a particular user's color usage preferences. In this way, a color scheme is selected or a page of a document is automatically colored using the color data maintained by the color agent.

This brief summary of the invention is provided so that the nature of the invention may be understood quickly. A fuller understanding may be obtained by reference to the following detailed description of the invention in connection with the appended drawings.

DETAILED DESCRIPTION OF THE PREFERRED EMBODIMENT

Figure 1:
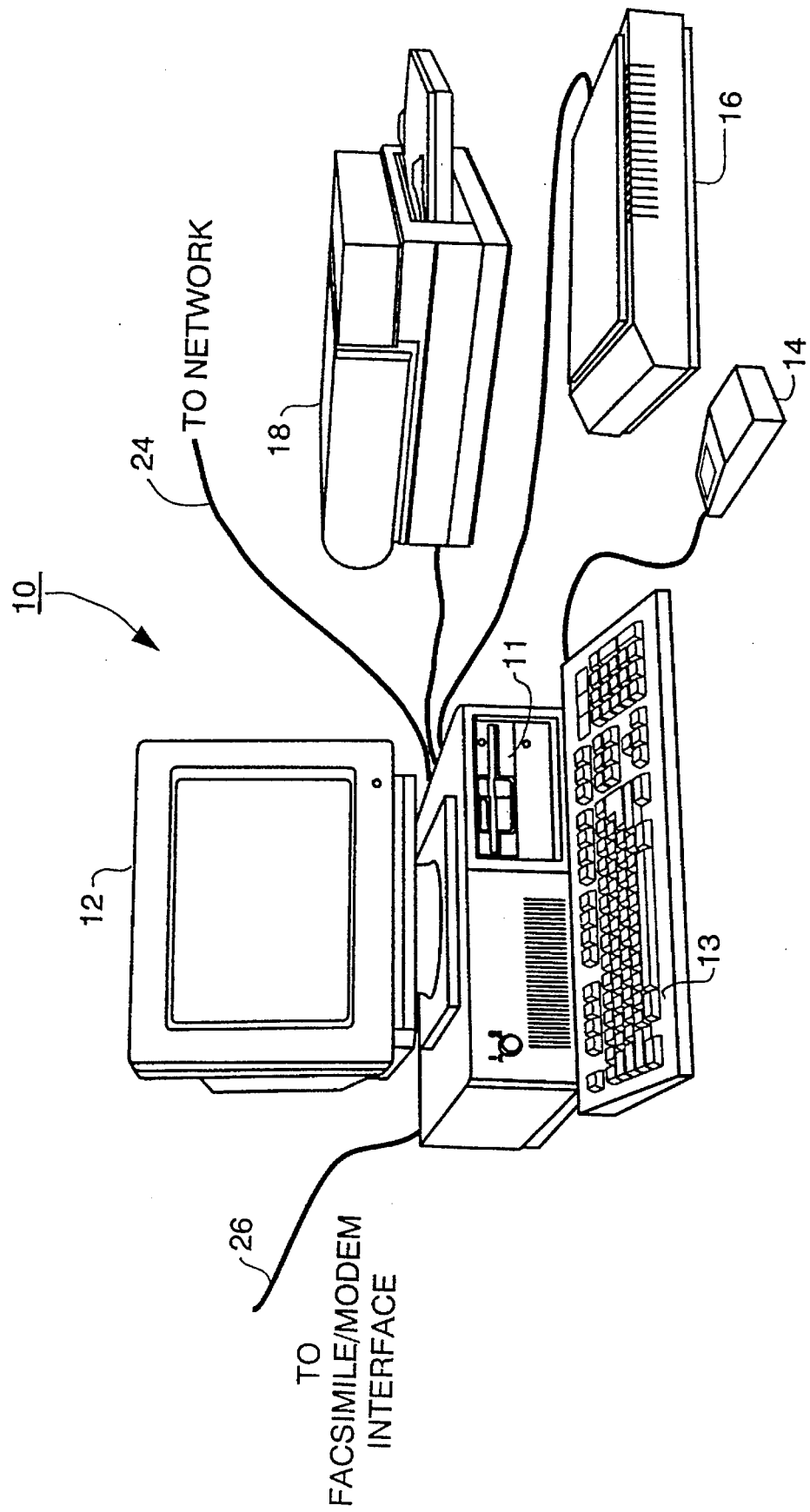
FIG. 1 is a perspective view showing the outward appearance of an apparatus according to the present invention.

FIG. 1 is a view showing the outward appearance of a representative embodiment of the invention. Shown in FIG. 1 is computing equipment 10, such as a Macintosh or an IBM PC or PC-compatible computer having a windowing environment, such as MicroSoft® Windows. Provided with computing equipment 10 is display screen 12, such as a color monitor, keyboard 13 for entering text data and user commands, and pointing device 14, such as a mouse, for pointing and for manipulating objects displayed on screen 12.

Computing equipment 10 includes a mass storage device such as computer disk drive 11 for storing data files which can include document text files and image files, in compressed or uncompressed format, and for storing application program files which can include a color scheme selection/colorizer application program, desktop publishing program, or other information processing programs which contain stored program instruction text by which computing equipment 10 manipulates the data files and presents data in those files to an operator via display screen 12.

Image data is input by scanner 16 which scans documents or other images and provides bit map images of those documents to computing equipment 10. Data may also be input into computing equipment 10 from a variety of other sources such as network interface 24 or other external devices via facsimile/modem interface 26.

Printer 18 is provided for outputting colorized documents processed by computing equipment 10.

It should be understood that, although a programmable general-purpose computer arrangement is shown in FIG. 1, a dedicated or stand-alone computer or other type of data processing equipment can be used to practice the invention.

Figure 2:
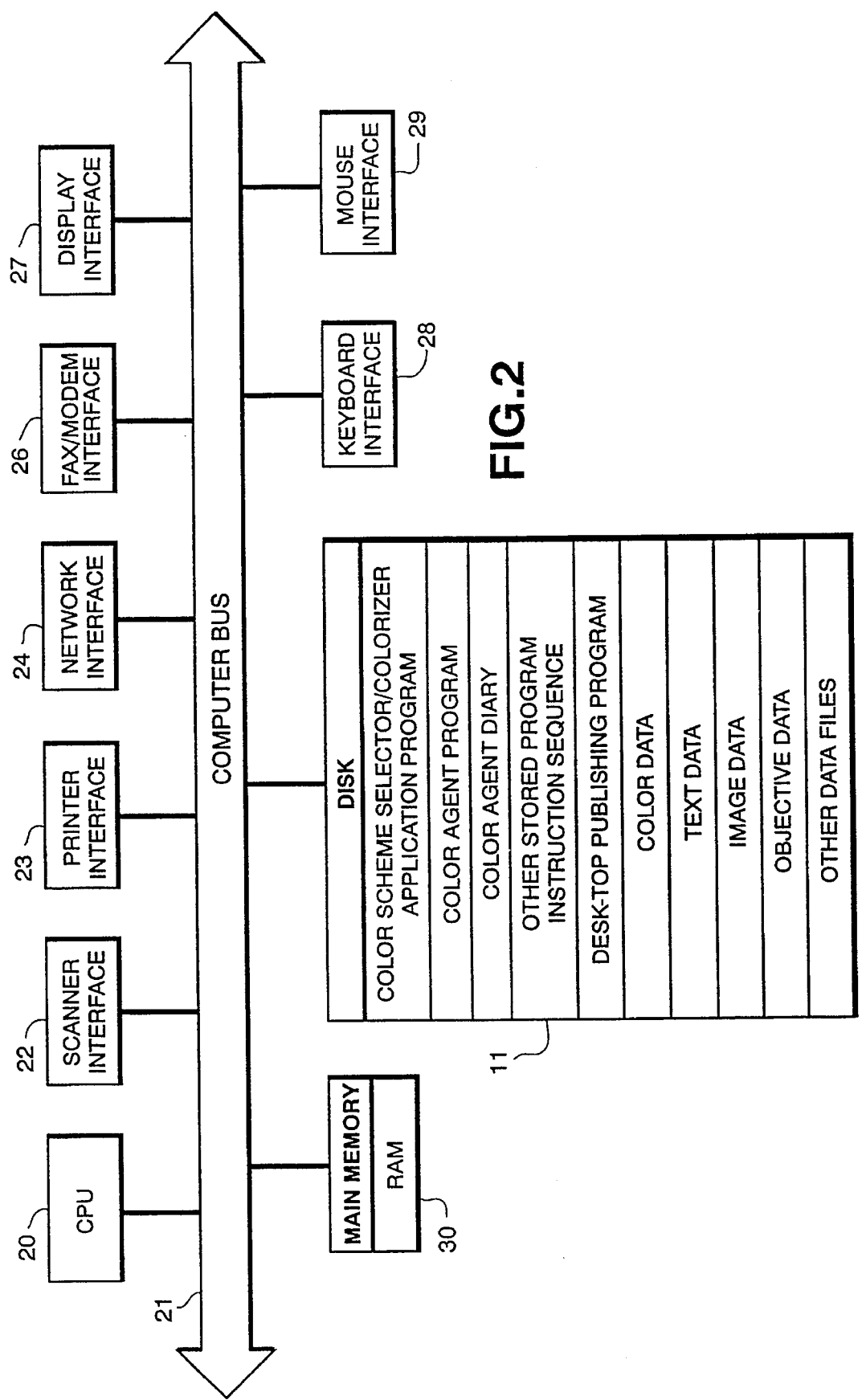
FIG. 2 is a block diagram of the FIG. 1 apparatus.

FIG. 2 is a detailed block diagram showing the internal construction of computing equipment 10. As shown in FIG. 2, computing equipment 10 includes a central processing unit (CPU) 20 interfaced with computer bus 21. Also interfaced with computer bus 21 is scanner interface 22, printer interface 23, network interface 24, fax/modem interface 26, display interface 27, keyboard interface 28, mouse interface 29, main memory 30, and disk 11.

Main memory 30 interfaces with computer bus 21 so as to provide random access memory storage for use by CPU 20 when executing stored program instructions such as the desktop publishing program or the color scheme selection/colorizer application program. More specifically, CPU 20 loads those programs from disk 11 into main memory 30 and executes those stored programs out of main memory 30.

In accordance with operator instructions, stored application programs are activated which permit processing and manipulating of data. For example, a desktop publishing program such as WordPerfect® for Windows may be activated by an operator to create, manipulate and view documents. Likewise, a colorizing program may be activated to permit the operator to colorize the document produced by the desktop publishing program.

in the present invention, some of the programs stored in disk 11 are "pluggable" programs, which can execute, from within themselves, one of a number of plug-in utility programs. The application program can invoke the utility, send it data, and retrieve any results from it. Ordinarily, the application program and the utility share a common file format and are capable of sensing the presence of each other's activities on the computer system. In operation, the currently executing program contains a menu for selecting any of the plug-in programs in the system. For example, while creating a document, a document-processing program application can generate a color scheme by executing the color scheme creation/colorizer program so that the document being created can be colorized.

In a similar manner, the present invention can operate independent from any other utility programs. In operation, the user is allowed to create color schemes and to input documents created by other utility programs so that the documents can be colorized.

The invention can also operate from within print driver software for computing system 10. In this case, the print driver intercepts normal software calls to the driver to print an uncolorized document, and invokes document colorization routines so as to colorize the document prior to print.

In addition, the present invention can also operate as a shared resource on a computer system, for example as a customized replacement of the system color picker in the MicroSoft® Windows operating system.

Figure 3:
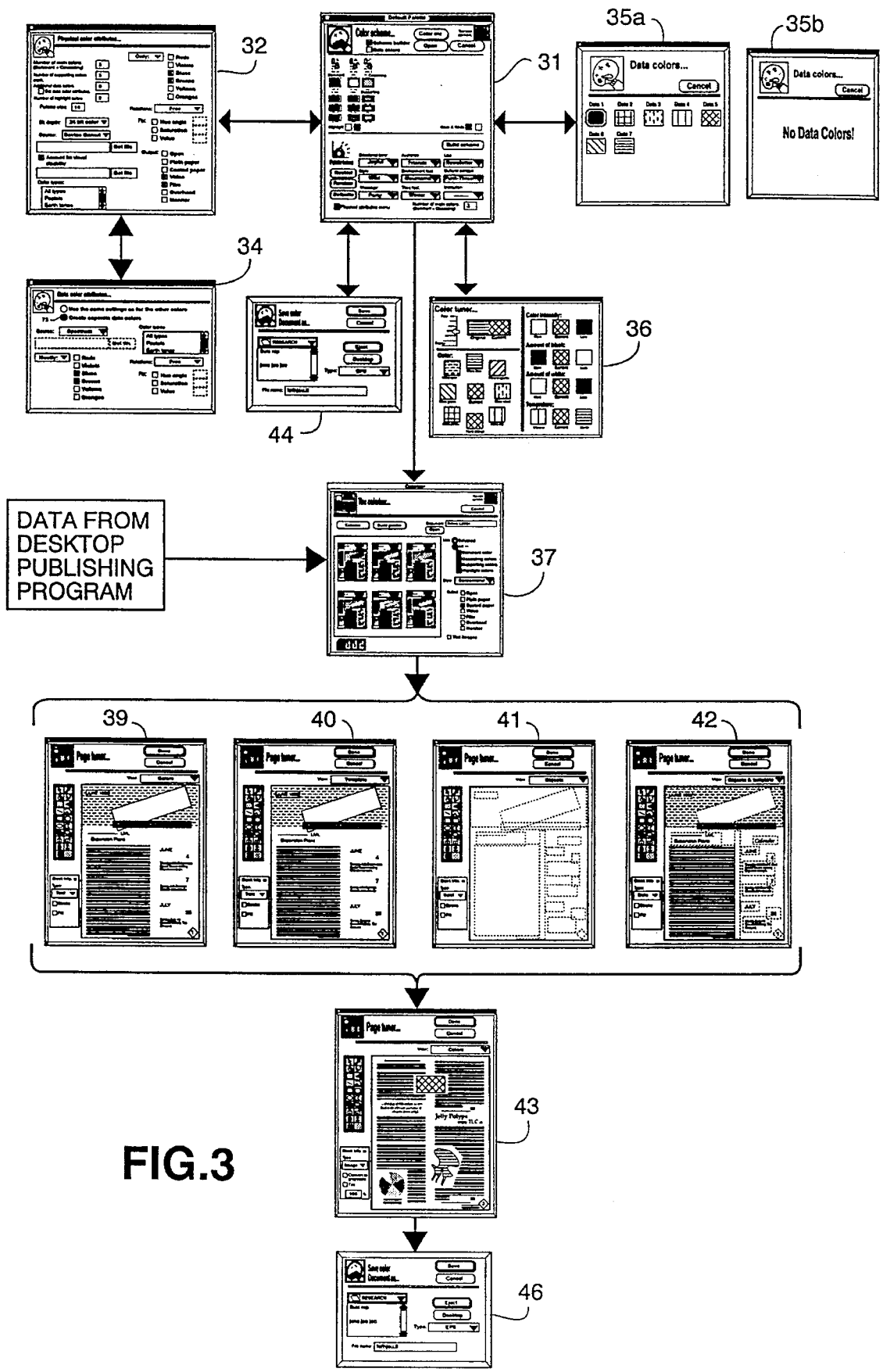
FIG. 3 illustrates a hierarchy of display windows for selecting a color scheme and for colorizing a document utilizing the selected color scheme.

FIG. 3 illustrates a hierarchical order of window displays for selecting a color scheme and for colorizing a document. This illustration will be used to provide a brief overview of the color scheme selection/colorizer program.

As shown in FIG. 3, when CPU 20 executes the colorizer program from memory, the first part of the program permits the selection of a color scheme. Once the color scheme is selected, the second part of the program permits colorization of a document.

As shown representationally, at the outset of the program, default palette window 31 is displayed and the user is provided with the ability to select color impact objectives from within window 31 to begin building a customized color scheme. In addition to selecting the color impact objectives, physical color attributes can be set by the user. Physical color attributes are designated in physical color attributes window 32 by defining settings for various features of the colors to be defined for selecting the color scheme.

In the case that data objects exist in the document, such as pie charts or graphs, it is possible to open, from the physical color attribute menu, data-color-attributes window 34 to define the data colors.

Once the desired color impact objectives and physical attributes are selected, a color scheme and associated data colors are determined. Data color window 35a can be called to display a color tile which corresponds to each defined data color, as defined in window 34. However, if no data color definitions are selected, data color window 35b alerts the user that no data colors have been defined. In either case, after physical color attributes and data color attributes (if necessary) are set, a user can fine-tune the color scheme and data color selections using color tuner window 36. Thereafter, the selected color scheme and data colors can be stored using window 44 and, if desired, exported to another utility program for use therein.

Once the color scheme has been selected, the color scheme can be used to colorize predesignated areas of a document created by a desktop publishing program. Thus, using colorizer window 37, a page of a document which has been selected and retrieved from a desktop publishing program file can be displayed and colorized. More specifically, the document page is reproduced as a plurality of thumbnail sketches which are smaller abstracts of the page document and are variously colored with combinations of colors from the current color scheme. The user selects one of the colored abstracts from the plurality of thumbnail sketches.

Then, using windows 39–42, the selected document page colorization can be modified, if desired. That is, any of the colored elements on the page can be colored with a different color from the scheme, as illustrated in page-tuner window 43. It is also possible to modify any of the colors directly. Once a color scheme is defined, any color in window 31 can be modified. This can be done at any time, before or after applying the color scheme to a document. When the user has completed the task of colorizing each of the desired pages in a document, save-color-document window 46 can be opened and the user can save the colorized document by identifying the document to be saved.

Figure 4:
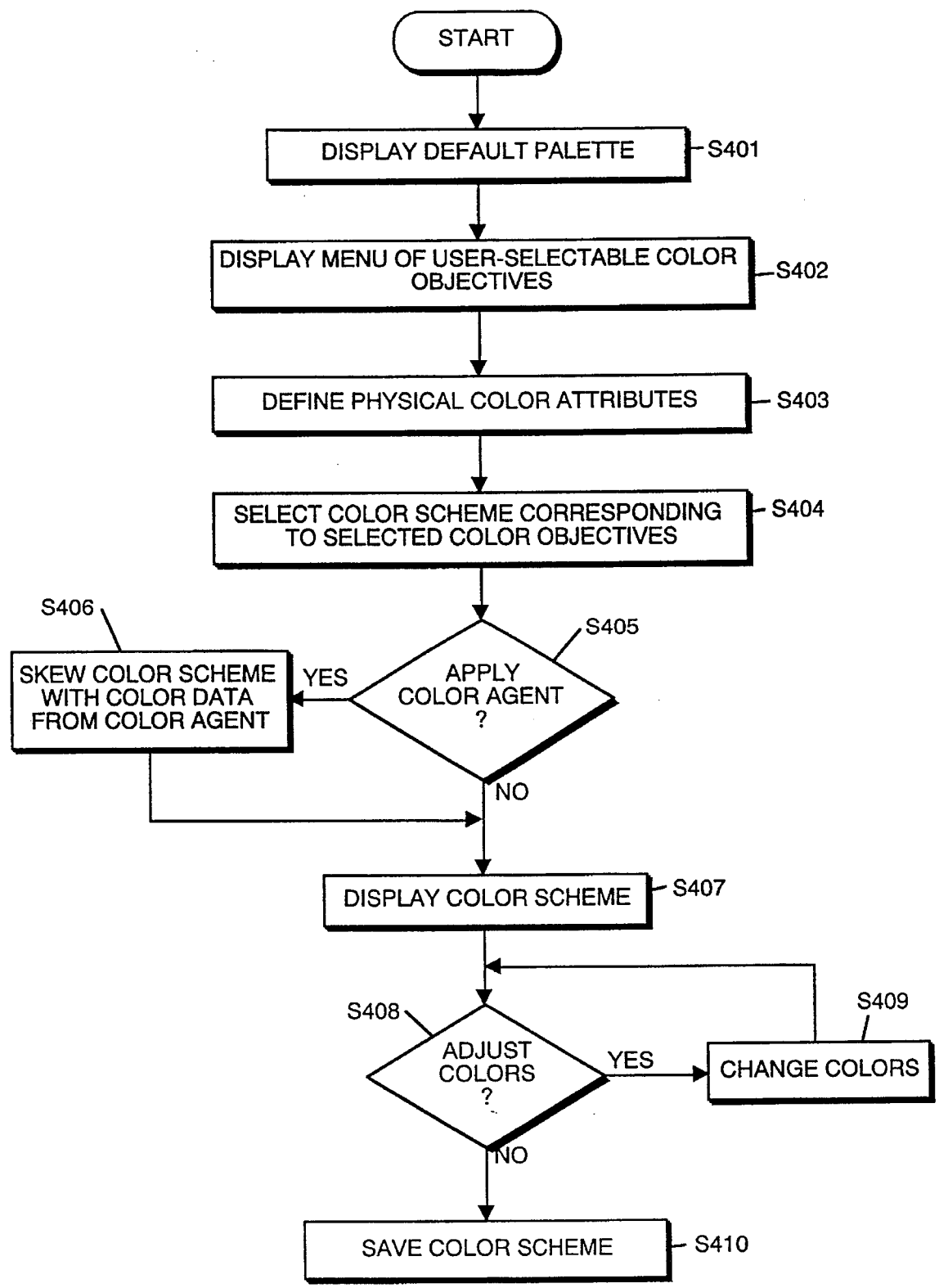
FIG. 4 is a flow diagram describing the method for selecting a color scheme.

FIG. 4 is a flow diagram illustrating the process of selecting a color scheme. The process steps shown in FIG. 4, and in the other flow diagrams of this specification, are executed by CPU 20 using instruction sequences stored in memory 30.

Figure 5:
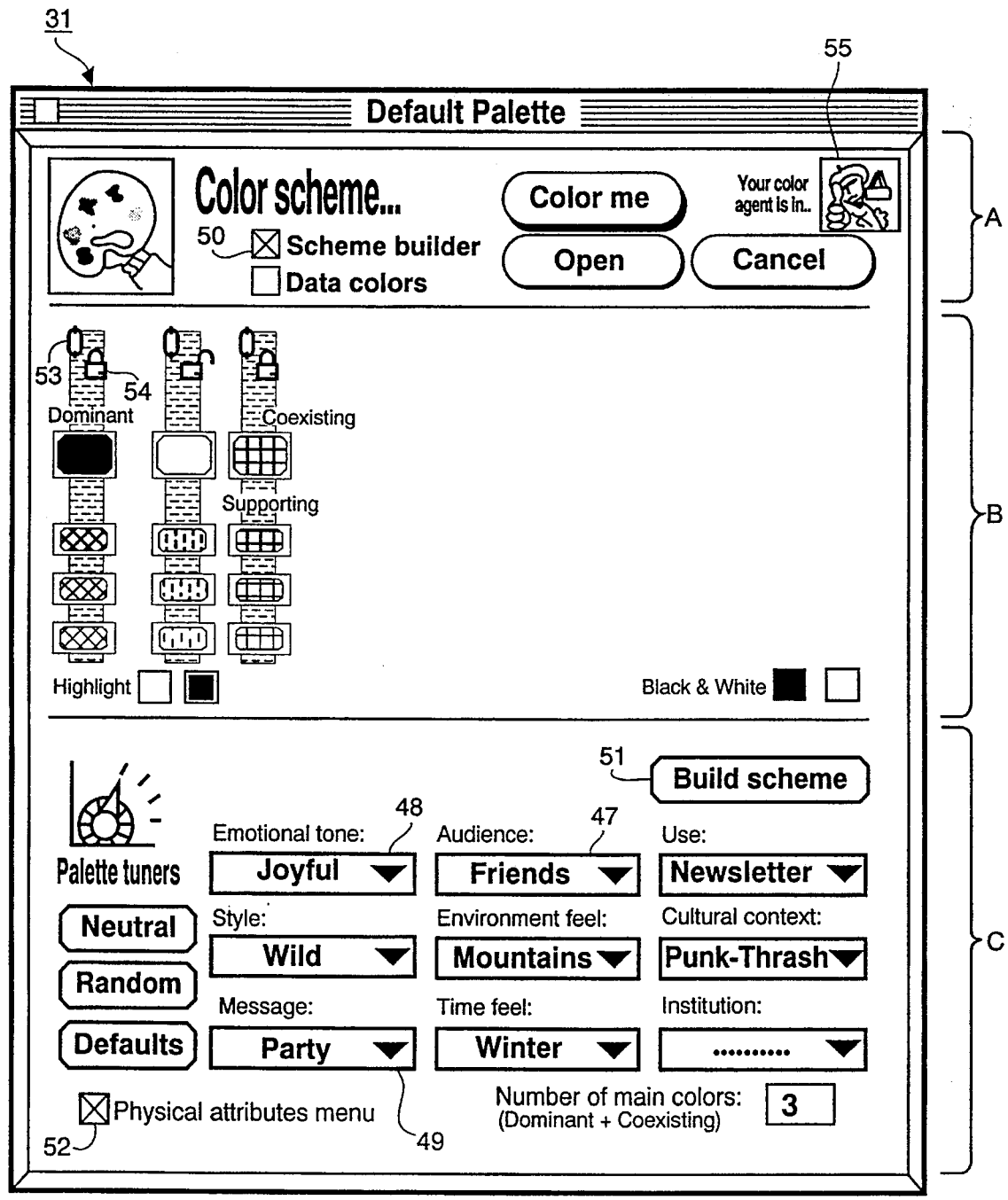
FIG. 5 is a representational view of a window display for building a color scheme from color impact objectives.

In step S401, the color scheme selection program of the color selection/colorizer program displays default-palette window 31. Though not shown in FIG. 5, default-palette window 31 initially appears with only portions A and B of the window present. In step S402, the color scheme-builder portion of the program can be actuated by using mouse 14 to insert the cursor in box 50. When the scheme-builder program is executed, portion C of default-palette window 31 appears.

Portion C of default-palette window 31 contains a pop-up menu of user-selectable color impact objectives. Color impact objectives allow a user to specify objectives for colors rather than the colors themselves. Typical color impact objectives include themes relating to audience, occasion, style, tone, and the like. A more complete example of some color impact objectives, and their themes, is shown below in Table A.

TABLE A

| Color Impact Objectives | | |
|---|---|---|
| Emotional Tone | Style | Message |
| Quiet | Elegant | Sports |
| Forceful | Festive | Party |
| Loud | Intimate | Activity |
| Angry | Aggressive | Wedding |
| Somber | Wild | Baby |
| Peaceful | Luxurious | Negotiation |
| Joyful | Fashionable | Solicitations |
| Romantic | Formal | Informative |
| Business | Noble | Musings |
| | Conservative | Proposal |
| | Conventional | Announcement |
| | | Personal |
| | | Business |
| Audience | Environment Feel | Time Feel |
| Management | Ocean | Winter |
| Coworkers | Mountains | Spring |
| Friends | Forest | Summer |
| Children | Desert | Fall |
| Teens | Southwest | 1920 USA |
| Adults | Northwest | 1960s USA |
| Elderly | Outer Space | Evening |
| West | South Pacific | Night |
| Mid-west | Institutional | Morning |
| East | | Noon |
| | | Afternoon |
| Use | Cultural Context | Institution |
| Presentation | Italians | IBM |
| Report | Japanese | Apple |

TABLE A-continued

Color Impact Objectives

| | | |
|---|---|---|
| Poster | Rockers | Aldus |
| Newsletter | Punk-Thrash | Canon |
| Article | Reage-ska | United Nations |
| Technical paper | New Age | |
| Documentation | Christian | |
| | Fine Art | |
| | Designer | |
| | Far Eastern | |
| | Mid Eastern | |
| | Native American | |
| | Latin | |

Combinations of objectives, such as "Audience" 47 and "Emotional Tone" 48, can be selected to define a more specific color scheme which combines objectives. Each color impact objective has a pop-down window such as window 49 which displays user-selectable themes such as "Party" in objective window "Message". While Table A provides various listings of both objectives and themes, it is to be understood that the color impact objective listings and color impact theme listings are only examples of objectives and themes which could be used with the color scheme selection/colorizer program.

In step S403, the user can further define the color scheme by determining physical color attributes, such as the number of colors to use, the source of the colors, and various other physical objectives which affect the color selection. The physical attributes of the color scheme are defined by actuating physical color attributes menu button 52.

Figure 6A:
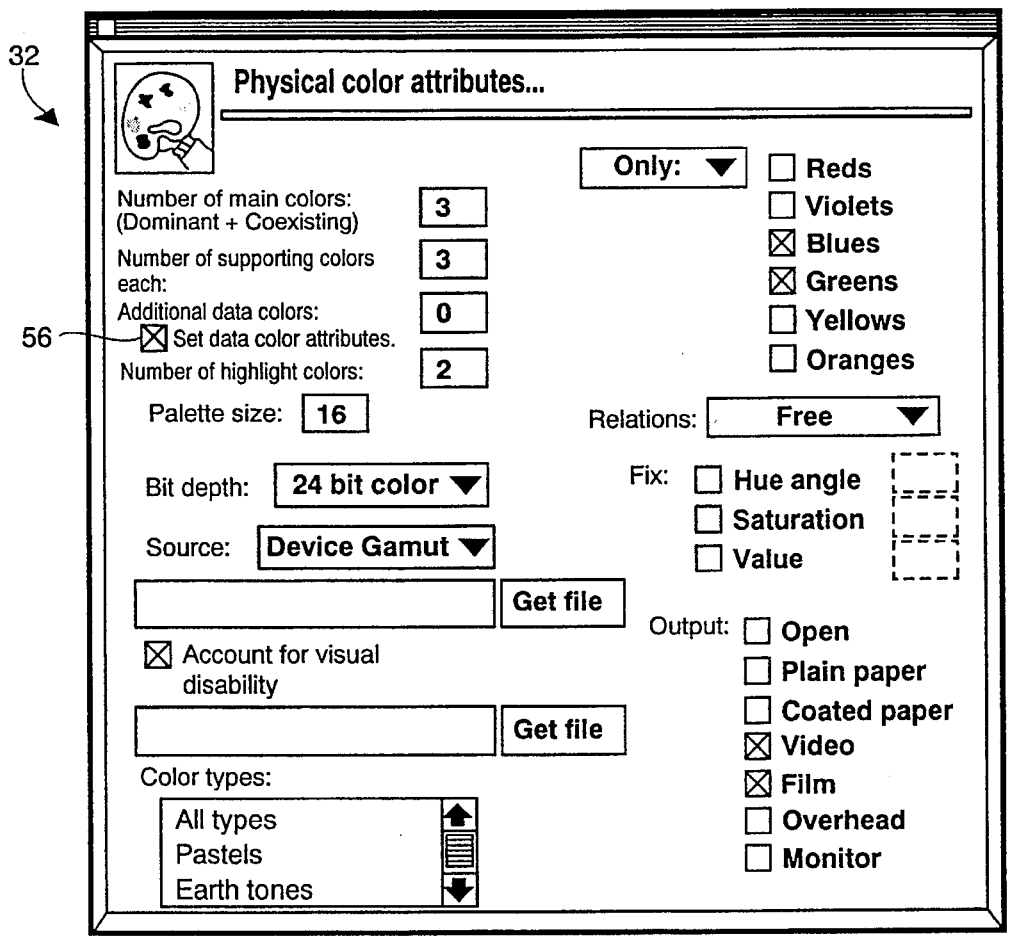
FIG. 6a is a representational view of a window display for defining physical color attributes and FIG. 6b is a representational view of a window display for selecting data color attributes.

Upon actuating physical color attributes menu 52, physical color attributes window 32 is overlaid over window 31. For example, in FIG. 6a, one of the physical color attributes that has been set for the color scheme is the palette size: three main colors (one dominant and two coexisting), three supporting colors (a set of three for the dominant color and each coexisting color), and two highlight colors. As shown in FIG. 6a, the physical color attributes may be further defined by setting the "bit depth", "source", what the color is to be "output" on, whether or not to account for color vision disability, etc.

Examples of some of the physical attribute selections from which to choose are shown below in Table B.

TABLE B

Physical Color Attributes

| Bit Depth | Source |
|---|---|
| 1 bit color | Spectrum |
| 2 bit color | Device Gamut |
| 4 bit color | Palette |
| 8 bit color | Pantone ™ |
| 24 bit color | Trumatch ™ |
| | Focoltone ® |
| | Toyo88 |
| | ColorFinder ™ |
| | ANPA-Color ™ |

Also, in step S403, the user can select data color attributes by actuating data-color-attribute window 34 shown in FIG. 6a. Data colors are special colors that are used to color data elements, like bar charts and pie charts, in documents. Because the data is usually a highlighted part of a document, the data colors are usually different from the other colors used to colorize the document page.

Figure 6B:
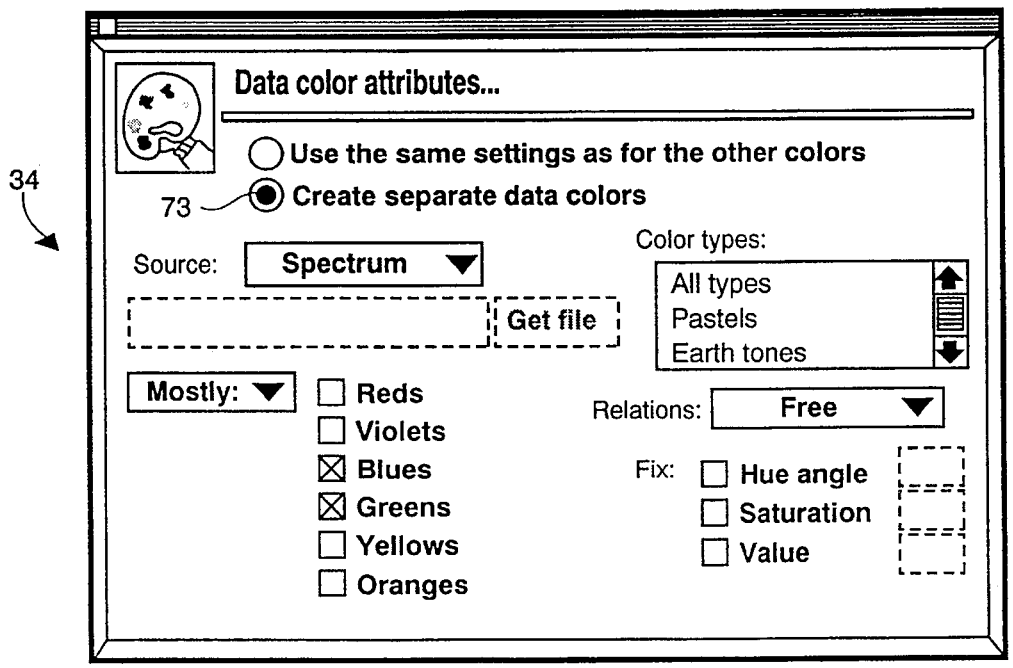

By selecting data color attributes box 56 in the physical color attributes window 32, the user can define data color attributes by actuating data-color-attribute window 34, as shown in FIG. 6b. Examples of some of the data color attribute selections are shown below in Table C.

TABLE C

Data Color Attributes

| Source | Color Types |
|---|---|
| Spectrum | All Types |
| Pantone | Pastels |
| Printer Gamut | Earth Tones |
| | Metallic |
| | Fluorescent |

| Color | Relations |
|---|---|
| Only Specified Color | Free |
| Mostly Specified Color | Harmonious |
| Any Colors | Contrasting |
| | Dissonant |

Figure 7A:
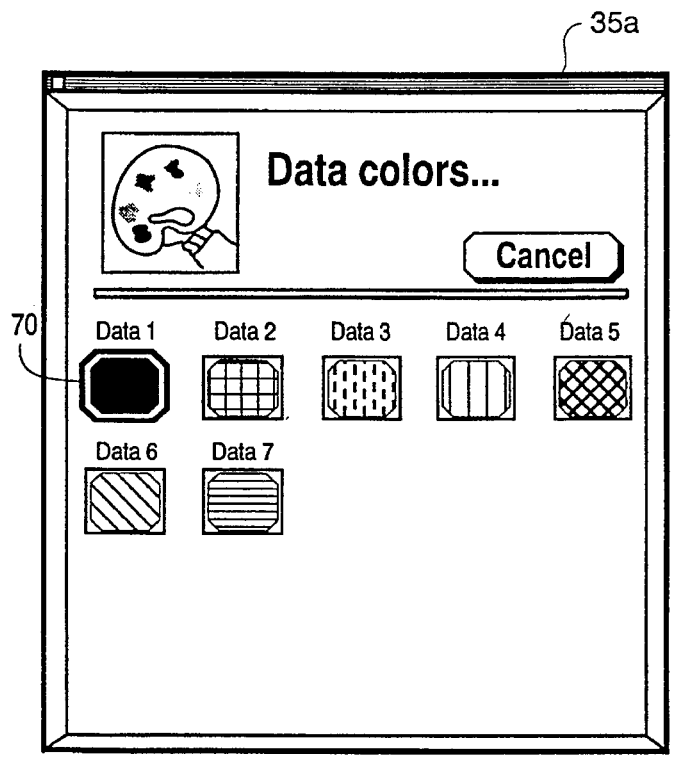
FIGS. 7a and 7b are representational views of window displays of selected data colors.
Figure 7B:
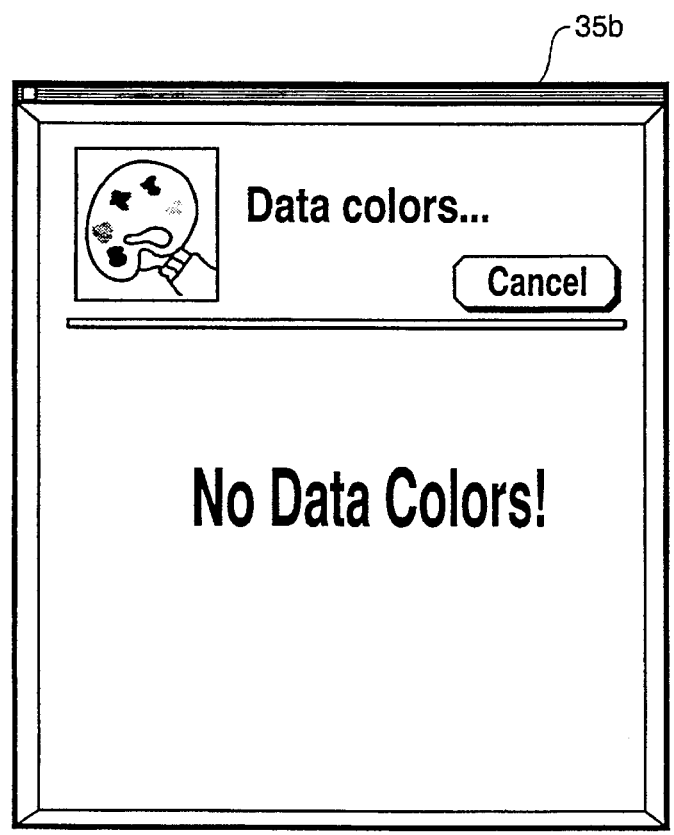

Using the settings in data-color-attribute window 34 and the general rule that data colors are usually vivid saturated colors of widely contrasting hues, the user-specified number of data colors are defined and can be displayed by the user in color data window 35a, shown in FIG. 7a. On the other hand, if no data colors have been defined, color data window 35b in FIG. 7b is displayed.

In step S404, by selecting button reference 51 "Build scheme" in window 31, the combination of selected color impact objectives, as constrained by the selected physical color attributes from physical color attribute window 32 and data color attribute window 34, are used by CPU 20 to select a color scheme and data colors; for example, one dominant color and two coexisting colors from the color knowledge base stored in disk 31. The process of selecting a color scheme by using a knowledge base can be performed by any well-known method, such as using a set of user-defined rules, fuzzy logic, or predesignating specific relationships between objectives and colors; for example, assigning a specific set of colors to each objective setting.

More preferably, however, dominant and co-existing colors are selected in accordance with one of the methods described below. These methods combine the user-selected color impact objectives so as to select the most suitable dominant and co-existing colors.

A first method of selecting dominant and co-existing colors, which is described in detail in Appendix 1.1, combines color impact objectives by assigning relevance values to each of the color impact objectives, adding the relevance values for the selected color impact objectives, and, for the dominant color, finding the maximum solution relevance value. More specifically, for each color impact objective, a relevance value is assigned to each of plural hue angles around a color wheel in HSB color space ("hue" "saturation" and "brightness"). The dominant color is selected by adding relevance values for each color impact objective designated by the user, and finding the maximum, as described above. Co-existing colors are selected by traversing the color wheel in triadic angular increments (i.e. 120°). Supporting colors are then selected by varying hue, saturation and brightness such that each supporting color is less saturated and darker than its associated dominant or coexisting color.

A second method of selecting dominant and coexisting colors, which is described in detail in Appendix 1.2, combines color impact objectives by selecting the maximum relevance values from among the user-designated objectives, for each hue angle.

After the dominant color and coexisting color(s) is/are selected, CPU 20 generates supporting colors for each of the major colors by shifting the major colors (the major colors are the dominant and the coexisting colors) in color space. At this time, the highlight and data colors, if any, are defined as well. A method for deriving supporting colors and highlight and data colors is described in section 1.3 of the attached Appendix.

In steps S405 and S406, the color agent program, which is a terminate and stay-resident (TSR) program, can be applied to skew color selections. The color agent varies the displayed color scheme by adding skew factors, which are based on a user's personal color preferences, and current color working trends. That is, as the user works on the computer, the color agent program remains active in the background so as to maintain a color diary of colors used by the user. The color agent program recognizes and records data relating to the user's color preferences such that past color usage patterns are used, if desired, to automatically adjust or skew a color selection.

In operation, if it is determined to apply the color agent (step S405), then flow advances to step S406 in which the color agent program determines color skew factors which are to be used in the scheme builder and colorizer in conjunction with the color impact objectives color scheme and the coloring of documents. As noted, these skew factors are only applied when the color agent's participation, or input, is requested by the user. As shown in the upper left-hand portion of default-palette window 31, icon 55 indicates whether the color agent has been activated in order to enhance the color work.

In step S407, the color scheme resulting from the user's color scheme selections (and, possibly, the color agent) is displayed in portion B of default-palette window 31.

In an alternative embodiment of the present invention, in step S407, the colors generated from the user's color objectives and attribute selections generates the same types of colors, however, instead of displaying a single color palette of these colors, plural palettes such as six palettes of various combinations of the dominant, coexisting, supporting, and highlight colors are generated and displayed. In yet a further variation of step S407, instead of displaying plural color palettes, the user can select an option to display a page of a document in multiple variously colorized thumbnail reproductions, such as six thumbnail reproductions, using the same color combinations that would have been displayed in the above-mentioned color palettes. In the next step, the user selects one of the color palettes and the flow proceeds to step S408 at which point the process is the same as in the preferred embodiment.

In step S408, the user can determine whether to manually adjust any of the colors, i.e., dominant, coexisting, supporting, highlight, or data. In the case that it is desired to manually adjust the colors in the color scheme, the user can select the color to be modified in the color scheme palette or data color palette (window 35a) by double clicking on the color to be modified. When the color is selected, color tuner window 36 is displayed as shown in FIG. 8.

Figure 8:
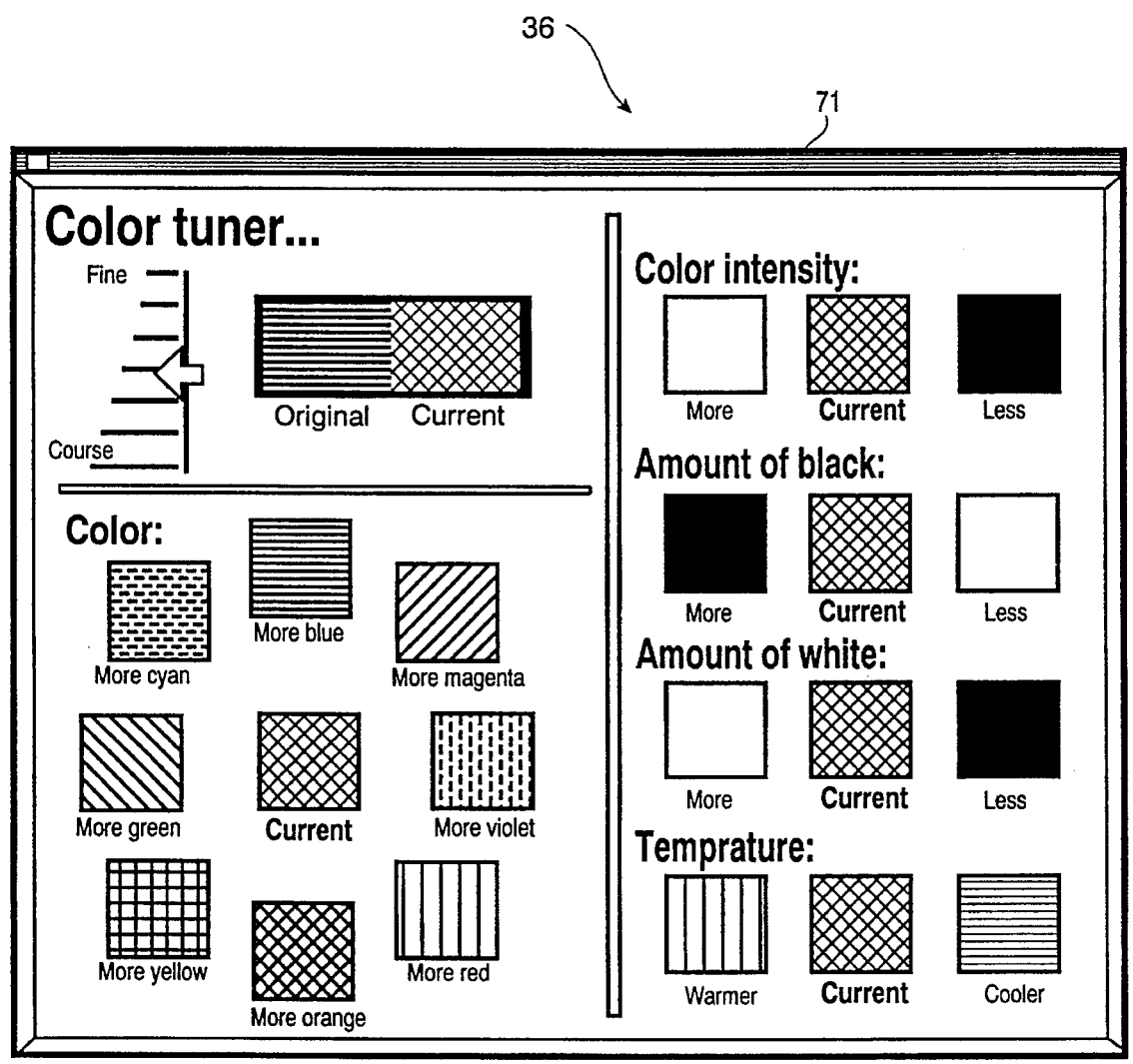
FIG. 8 is a representational view of a color tuner window display.

FIG. 8 is an example of color tuner window 36, which includes color tuner 71. Color tuner 71 allows the user to modify original colors by adding selected amounts of other hues, i.e., more red, more blue, or more green. The original color can also be modified by adding or subtracting amounts of color intensity, blackness, whiteness, or shifting color warmth. As shown in FIG. 8, the bar slider in the upper left-hand corner allows the user to set increments of changes which simultaneously change the color based on the previously-described color tuner selections. The two color boxes next to the bar slider show the original color as it is unchanged; the other box shows the color at its current level of change. Changes are immediately reflected as they occur in the color as it appears in the color scheme palette and colorized pages. The changes are finally set when a new color is selected from the color scheme palette.

If desired, a user can iteratively build new palettes of colors by beginning again in step S401, changing some of the color impact objectives and attribute selections and rebuilding the palette by selecting button reference 51 "Build scheme" in window 31. Alternatively, by keeping the same color objectives and attribute settings, the user can iteratively build new palettes of colors just by selecting button reference 51 "Build scheme" in window 31. While doing this, a user can maintain any desired major colors, and their subordinate supporting colors, by "locking" the colors to be maintained, as shown in reference 54 of window 31, and changing those sets of colors that are not locked together using the "Build scheme" button. In addition, the user can link (or chain) a major color and its subordinate supporting colors by using reference 53 of section B in window 31, so that when any one of the linked colors is modified in a color tuner, the others will also change in such a way as to maintain, for example, the original triadic color relationship between them.

For example, if the user links a set of colors that all have a greenish hue and then changes one of them to a reddish hue, all of the colors that are linked with the changed color will automatically change in a similar way to a reddish hue. The linked, or chained, colors always maintain their original color appearance relationships to each other. Two colors that differed perceptually by delta X saturation in the green hue would still differ perceptually by delta X saturation after being shifted towards the red hue.

Once the color scheme has been generated and adjusted to the user's personal preference (step S409), it is possible to save the generated color scheme to a file stored on disk 11 for future use (step S410). The color scheme can either be saved as a set of colors in a color palette file ready to be used by other computer application programs, or it can be saved as the utility settings that were used to create it. Saving the color scheme as a utility setting means that the scheme can be used and modified again in the utility but that it can not be used by other computer application programs. At this point the user may also print the generated color scheme to be used as a hard copy reference for latter work.

Figure 9:
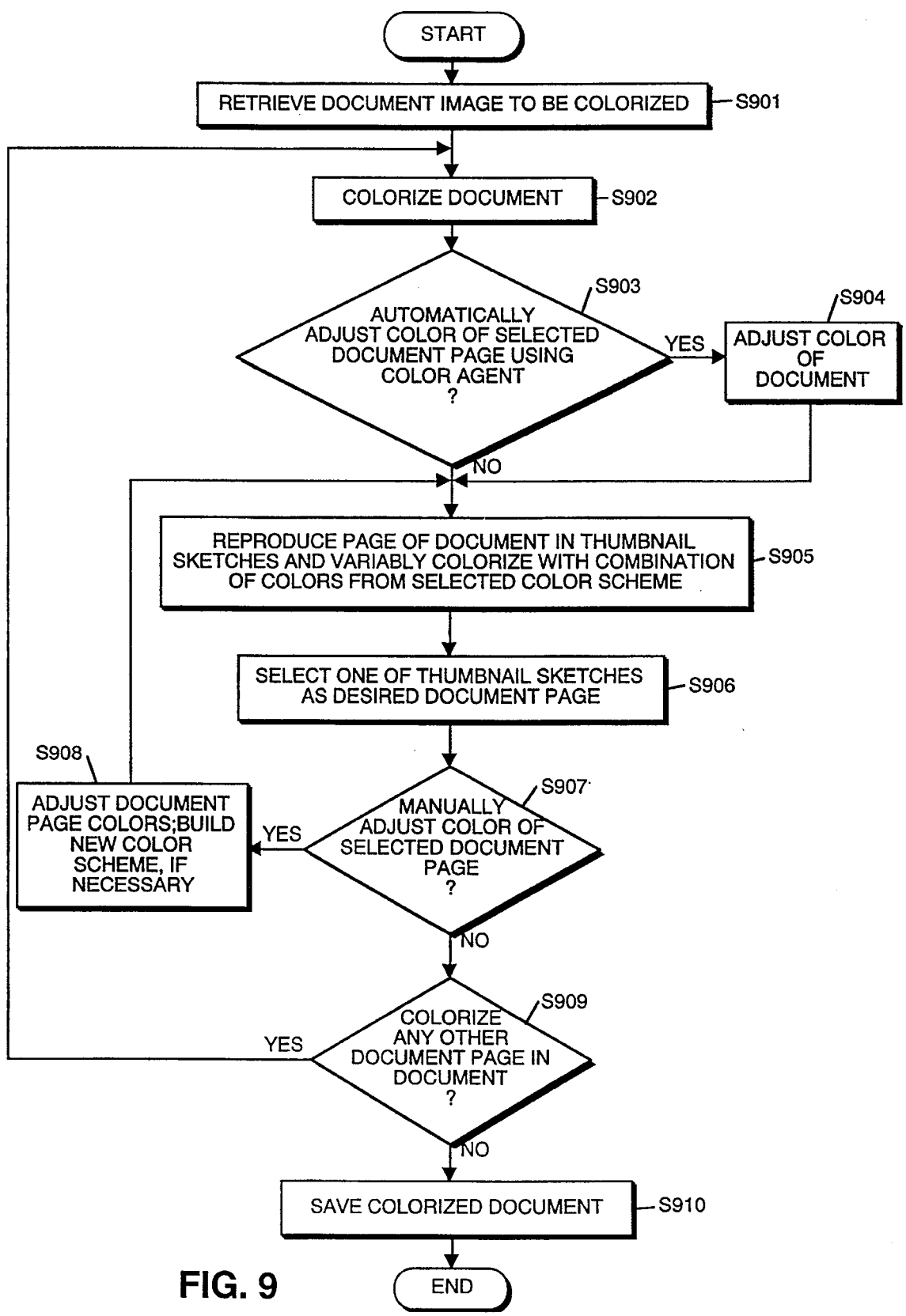
FIG. 9 is a flow diagram describing the method for colorizing pages of a document.

FIG. 9 is a flow diagram describing the method for colorizing pages of a document.

In step S901, the user selects and retrieves a document stored in disk 11 and loads the document into main memory 30. CPU 20 retrieves the document from main memory 30, colors it with the currently defined color palette, and displays the first page of the document on display 27. In step S902, the document is colorized using the selected color scheme. In step S903, a user is permitted to allow the color agent to automatically adjust (or skew) the color of one or more selected document pages. If the color agent is selected, the color agent will colorize the selected pages based on previous color scheme selections of the user (step S904). More particularly, as described above, the color agent varies colorization of the displayed page by adding skew factors that are based on the user's personal preferences and current color working trends, as monitored and stored by the color agent. As a specific example, as the user works with color on his computer, the color agent remains active in the background as a TSR program so as to maintain a diary of color usage and color preferences. In window 37 of FIG. 10, toggleable icon 78 indicates to the user whether the color agent is "in" (or active).

In step S905, a page of the document is reproduced a plurality of times in thumbnail sketches which are smaller abstracts of the original page. Each thumbnail abstract is automatically and variably colorized in combinations of colors from the generated color scheme. Step S905 will be explained below in greater detail with respect to FIG. 10.

Figure 10:
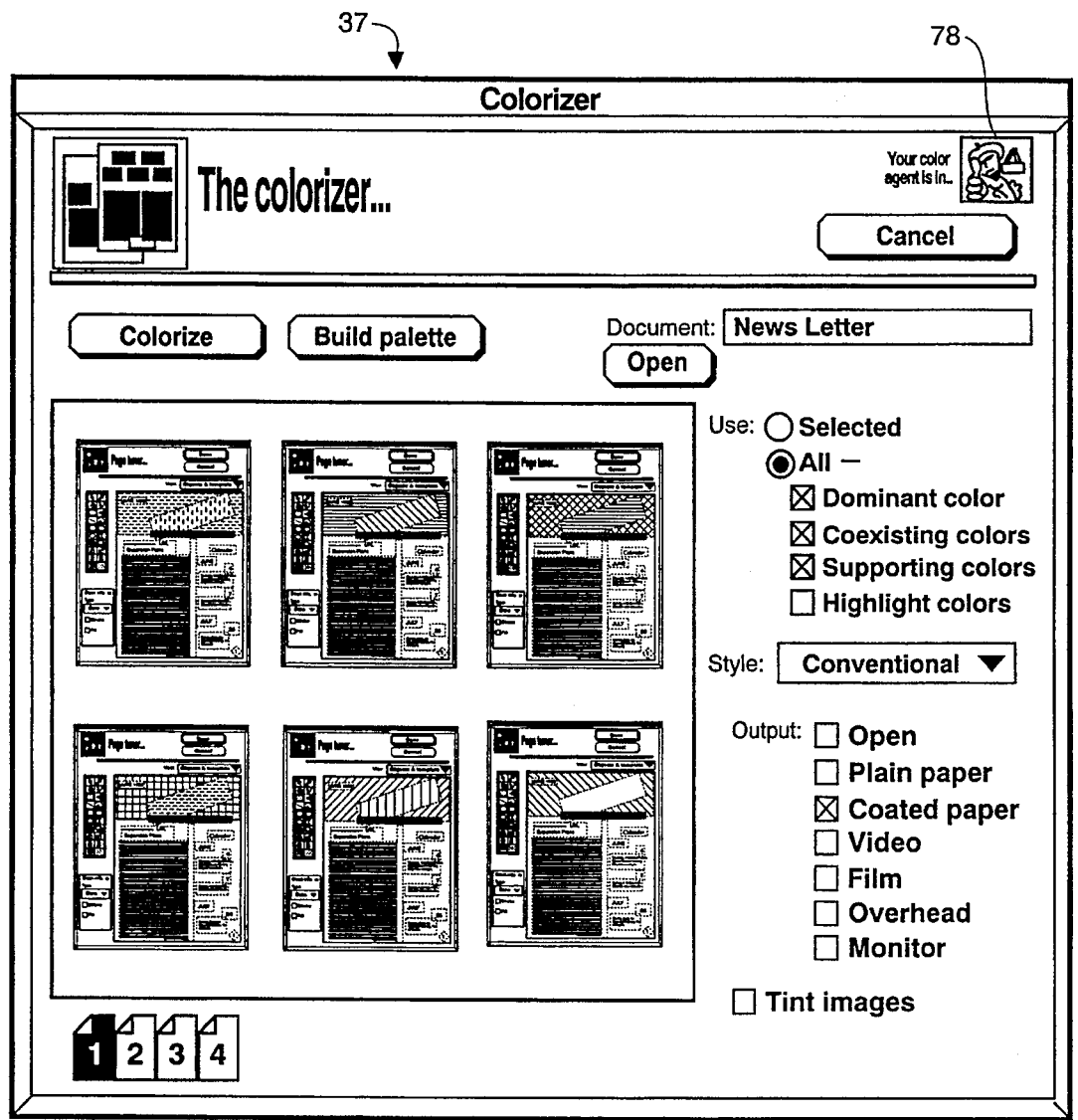
FIG. 10 is a representational view of a window display illustrating variably colorized thumbnail sketches of a document page in the colorizing window.

FIG. 10 illustrates colorizer window display 37. Colorizer window 37 shows each thumbnail abstract variably colored in varied combinations of the generated color scheme. As shown in the bottom left-hand corner of colorizer window 37, page menu 80 indicates the number of pages in the document and the present page displayed in the thumbnail abstracts. By using the pointing device, the user selects a desired thumbnail abstract by placing the cursor on the thumbnail sketch and depressing the pointing device on the desired thumbnail abstract in step S905. Upon selecting the desired thumbnail sketch, colorized document 90 appears in page-tuner window 39, as discussed below in greater detail with respect to FIG. 11.

Figure 11:
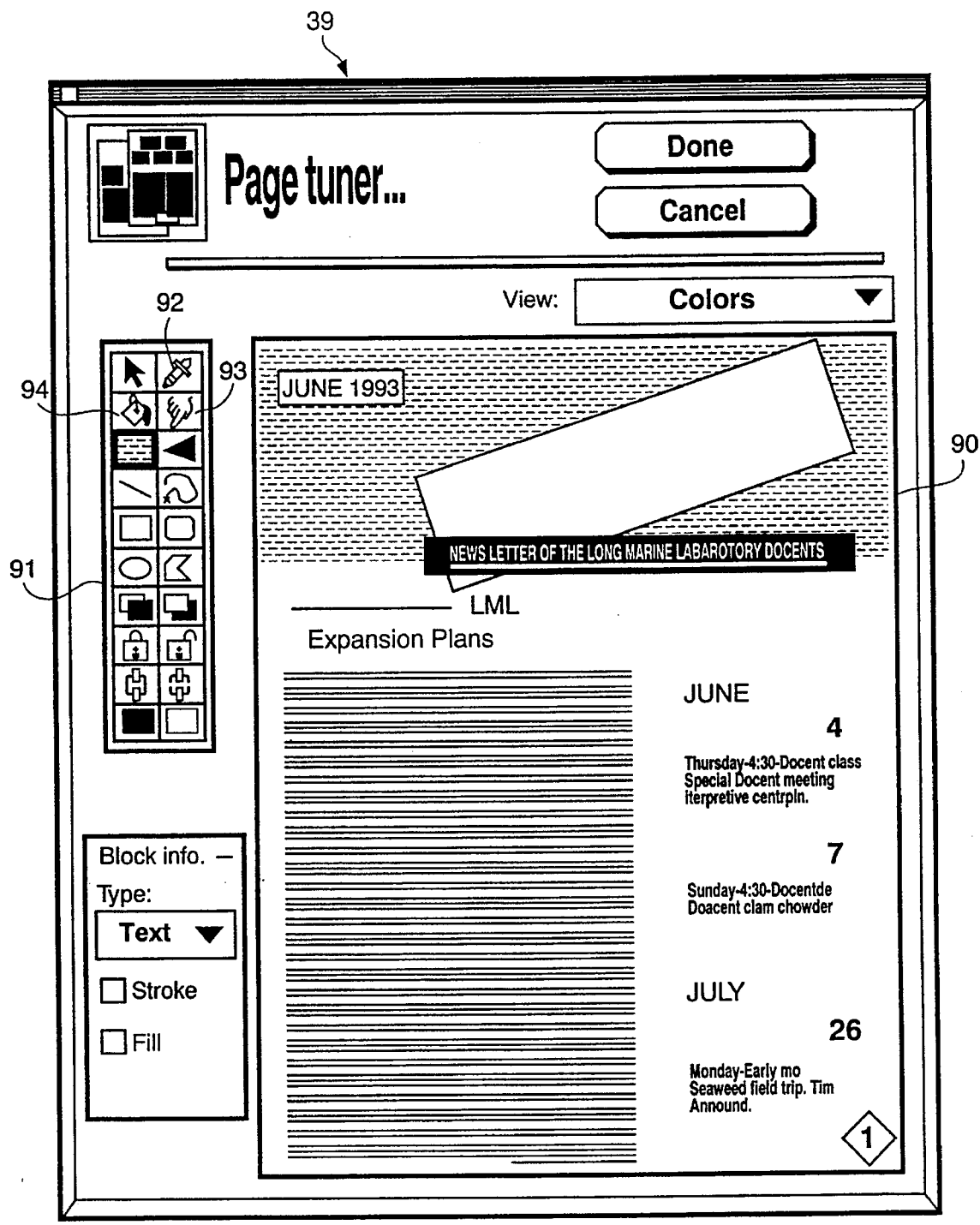
FIG. 11 is a representational view of a window display illustrating the color view of the colorized document page image selected by the user from the thumbnail sketches illustrated in FIG. 10.

In step S906, a selected thumbnail abstract is expanded in colorized document page 90, as shown in FIG. 11. Page-tuner window 39 permits the user to manipulate and change the coloring of document elements (step S907). Thus, in step S908, the user can select any of the tools located in tool palette 91 to modify colors in colorized document 90. For example, eyedropper 92 can be used to select a color from the color scheme palette in the default-palette window or from the colored elements in the document page shown in the page-tuner window. Smudge tool 93 can be used to color a page element with a blend between two selected colors or bucket tool 94 can be used to color an element with a solid color.

At any time while the user is working with the colorizer, the colors may be adjusted or modified in the default-palette window by using the chain icon and the color tuner. Those changes are automatically reflected in the corresponding colors in the colorizer pages. Of course, if the user is not satisfied with any of the colors, either before adjusting the color scheme or even after, the user may build an entirely new color scheme using the default-palette window's "Build scheme" button and lock icons, as discussed previously.

To assist the user in manually adjusting colors, it is possible for CPU 20 to use pre-defined style sheets or to use document block identification and selection techniques such as those described in commonly assigned application Ser. No. 873,012, filed Apr. 24, 1992, "Method And Apparatus For Character Recognition", so as to automatically identify various parts, or blocks, in a document, such as titles, headings, captions, text, etc. It is then possible for the user to select various features of a document, such as headings, and to colorize the headings only, for example, in orange. Alternatively, it is possible to provide a further degree of user settable automation for coloring documents by saving a file of the color assignments that are made to low-level global elements, like setting all of the 24 point Helvetica characters in a document to red. Thereafter, the saved color scheme can be applied by the colorizer to another document file to, for example, automatically color all of the 24 point Helvetica characters in a document to red.

Figure 12:
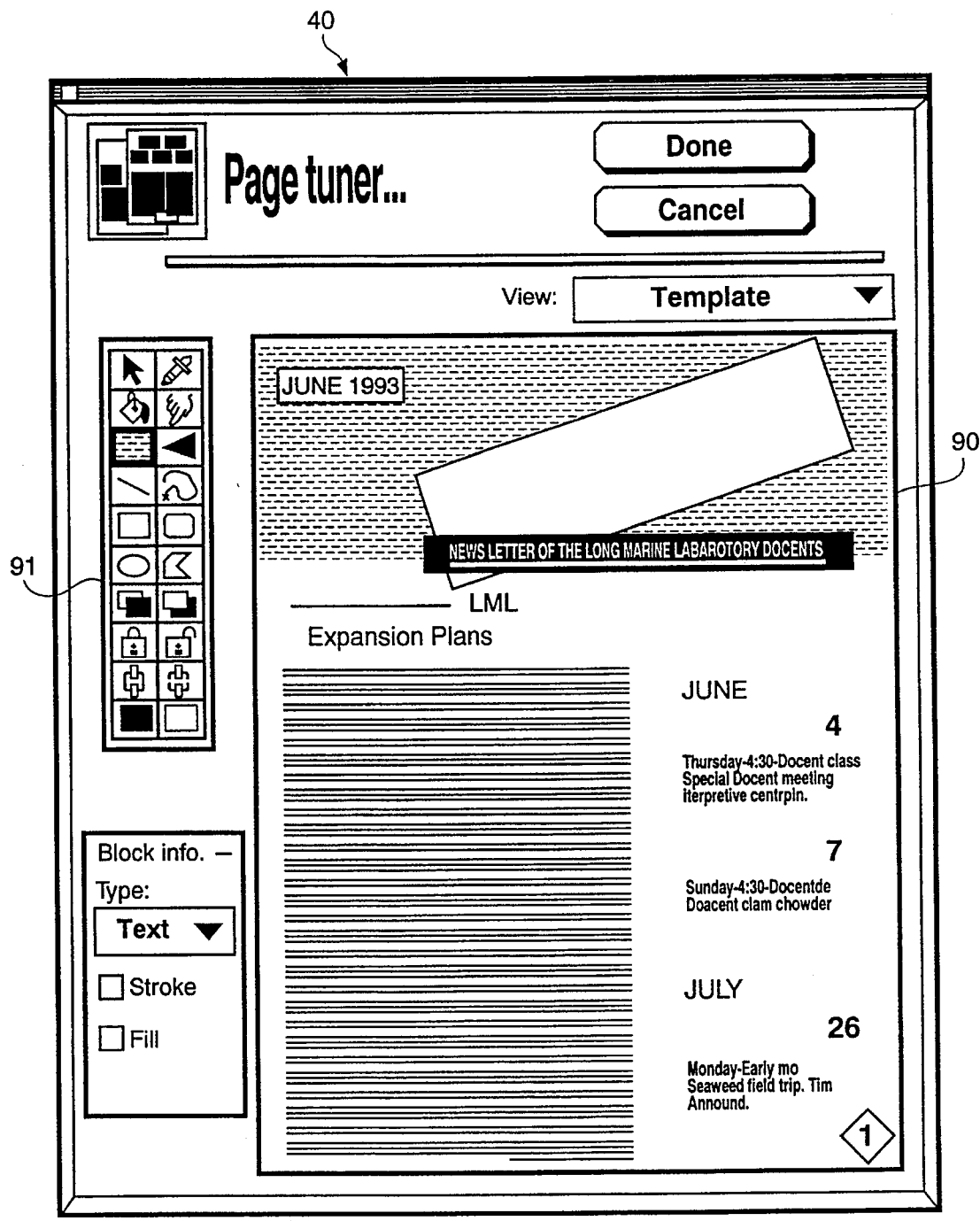
FIG. 12 is a representational view of a window display illustrating the template view of the selected document page image.
Figure 13:
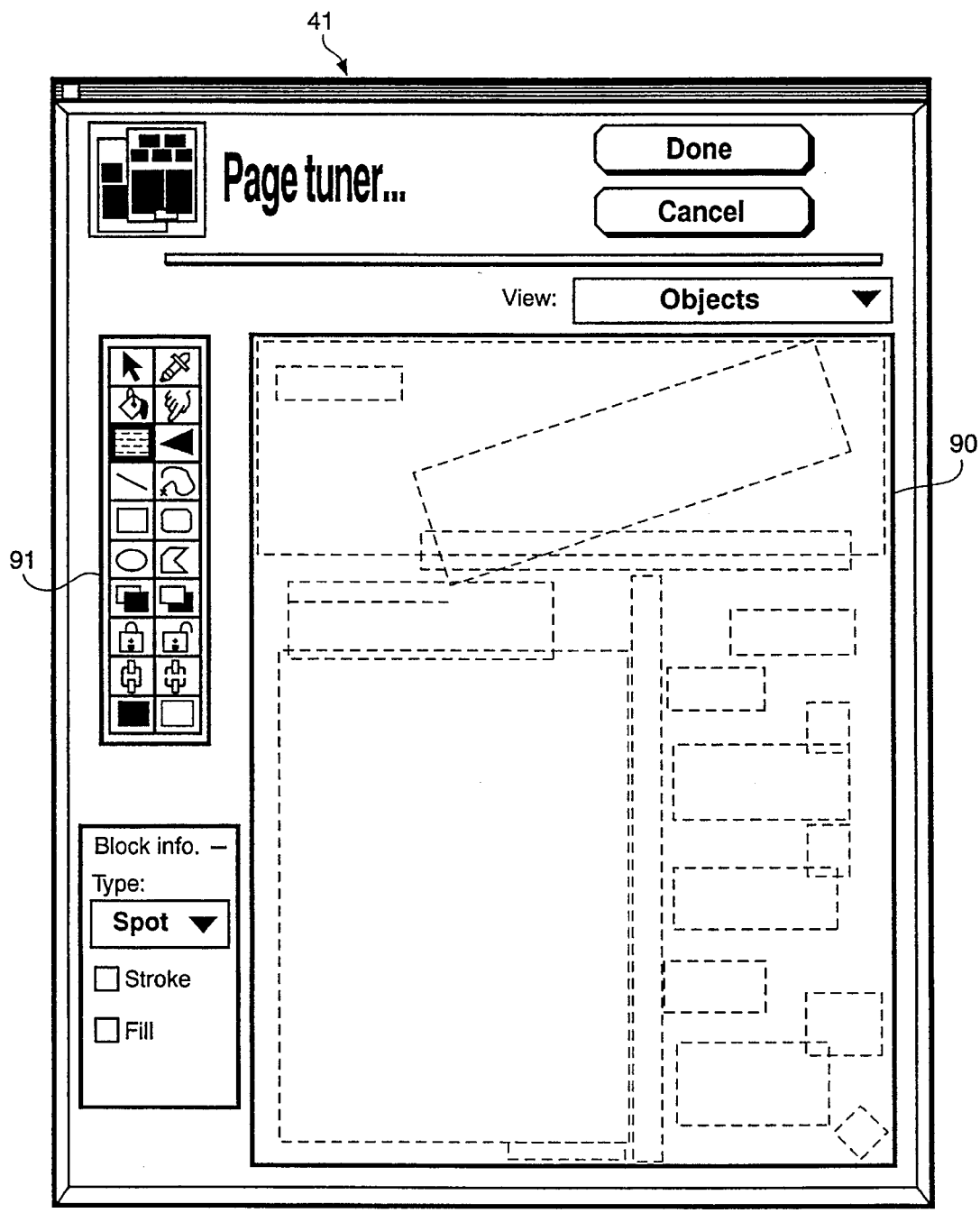
FIG. 13 is a representational view of a window display illustrating the object outlines view of the elements in the selected colorized document page.
Figure 14:
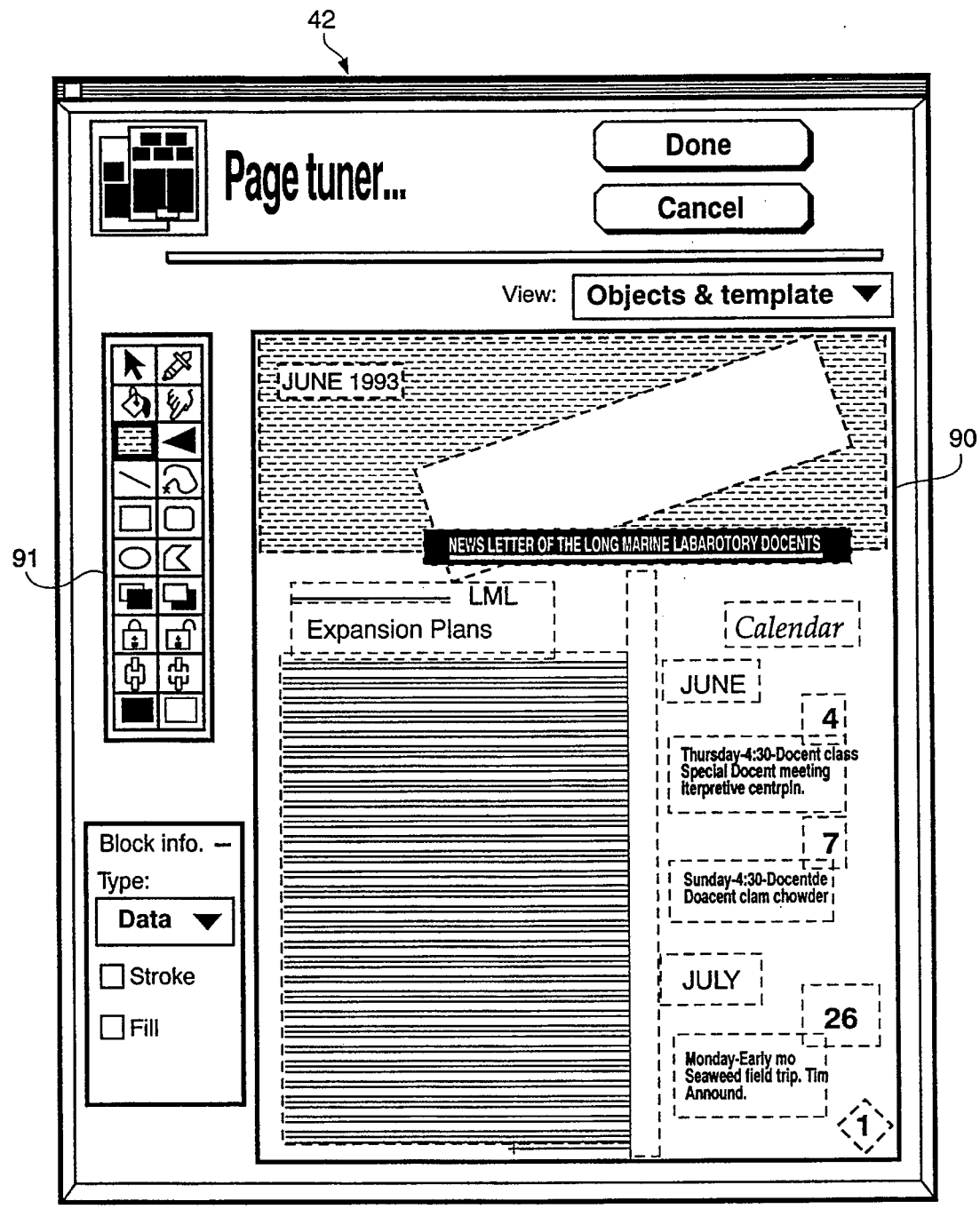
FIG. 14 is a representational view of a window display illustrating an object and template view of a document to be colorized.

In order to facilitate tuning a colorized page, the user is provided with different views of the document. FIGS. 11, 12, 13, and 14 illustrate the various page-tuner window views of the first page in the document. FIG. 11 is a view of the colorized page. FIG. 12 is a view of the document before the document image was colorized. This view is used as a reference to see a detailed view of the template elements. FIG. 13 is a view of the original document, with elements shown as outlined shapes. This view allows the user to review colorized objects in the document. FIG. 14 is a view of the colorized object outlines of FIG. 13 superimposed on top of the image of the original page from the application in FIG. 12. All color work is done in the FIG. 11 view, the FIG. 12 view is for reference, and the FIGS. 13 and 14 views are provided for identifying, manipulating, and selecting the page elements to be colored.

Figure 15:
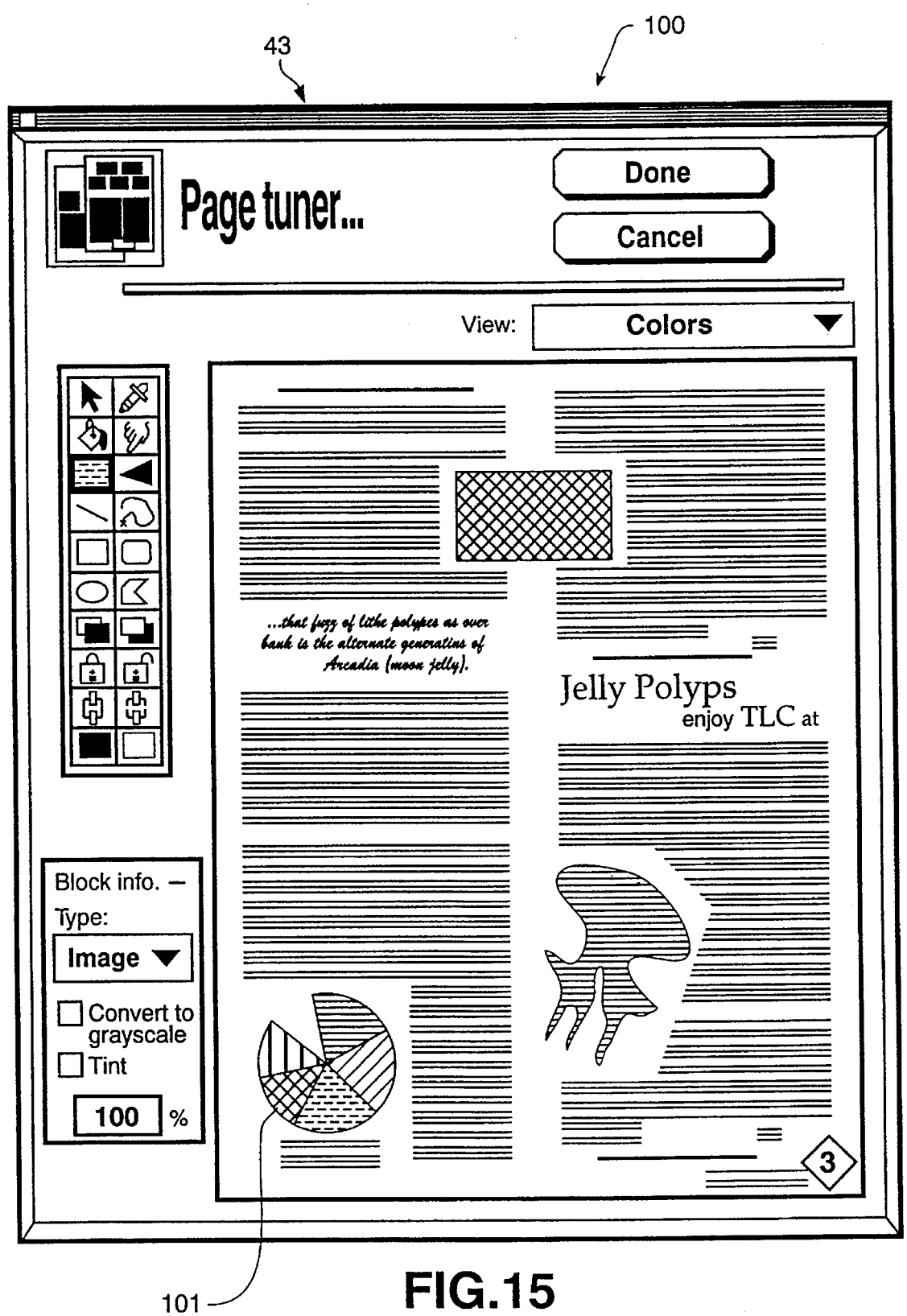
FIG. 15 is a representational view of a window display illustrating the method for adjusting the color of data images in a document page.

Once the user is satisfied with the colorization of this document page, the remaining document pages can be colored, one by one, by selecting another page from page menu 80, at the bottom of colorizer window 37, and repeating steps S902 through S907, in accordance with user selection at step S909. For example, in FIG. 15, page 2 of the document has been selected. Second page 100 includes data object 101, which is a pie chart. Data object 101 is colorized in accordance with the data colors defined in data-color-attribute window 34.

Figure 16:
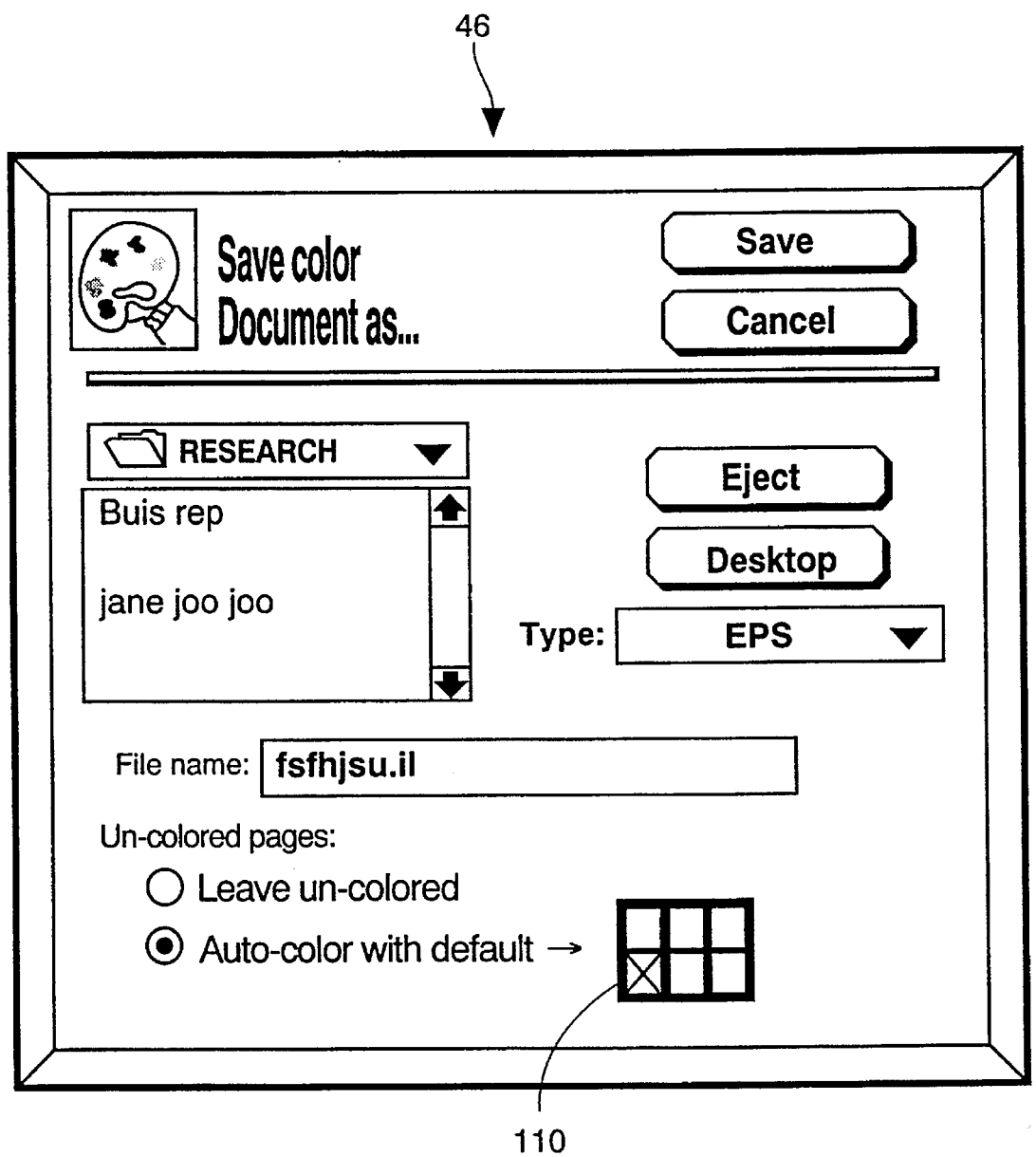
FIG. 16 is a representational view of a window display illustrating the manner of saving a colorized document.

If no pages remain in the document or no further pages are to be colorized in the document, then flow proceeds to step S910. As shown in FIG. 16, the colorized document is saved by opening save-color-document window 46. While saving the pages in the document that have not been explicitly colorized, the user can request that the remaining pages in the document be automatically colorized by the program using an operator-settable default colorization option 110. The default colorization is picked from save-color-document window 46 as one of the thumbnail locations that had appeared in colorizer window 37.

Figure 17:
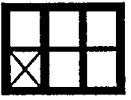
FIG. 17 is a representational view of a window display illustrating the manner of printing a colorized document.

In a similar fashion, the colorized document could be printed directly from the colorizer using print document window 47 shown in FIG. 17. In which case, the print document window 47 would be used instead of the save document window 46.

Figure 18:
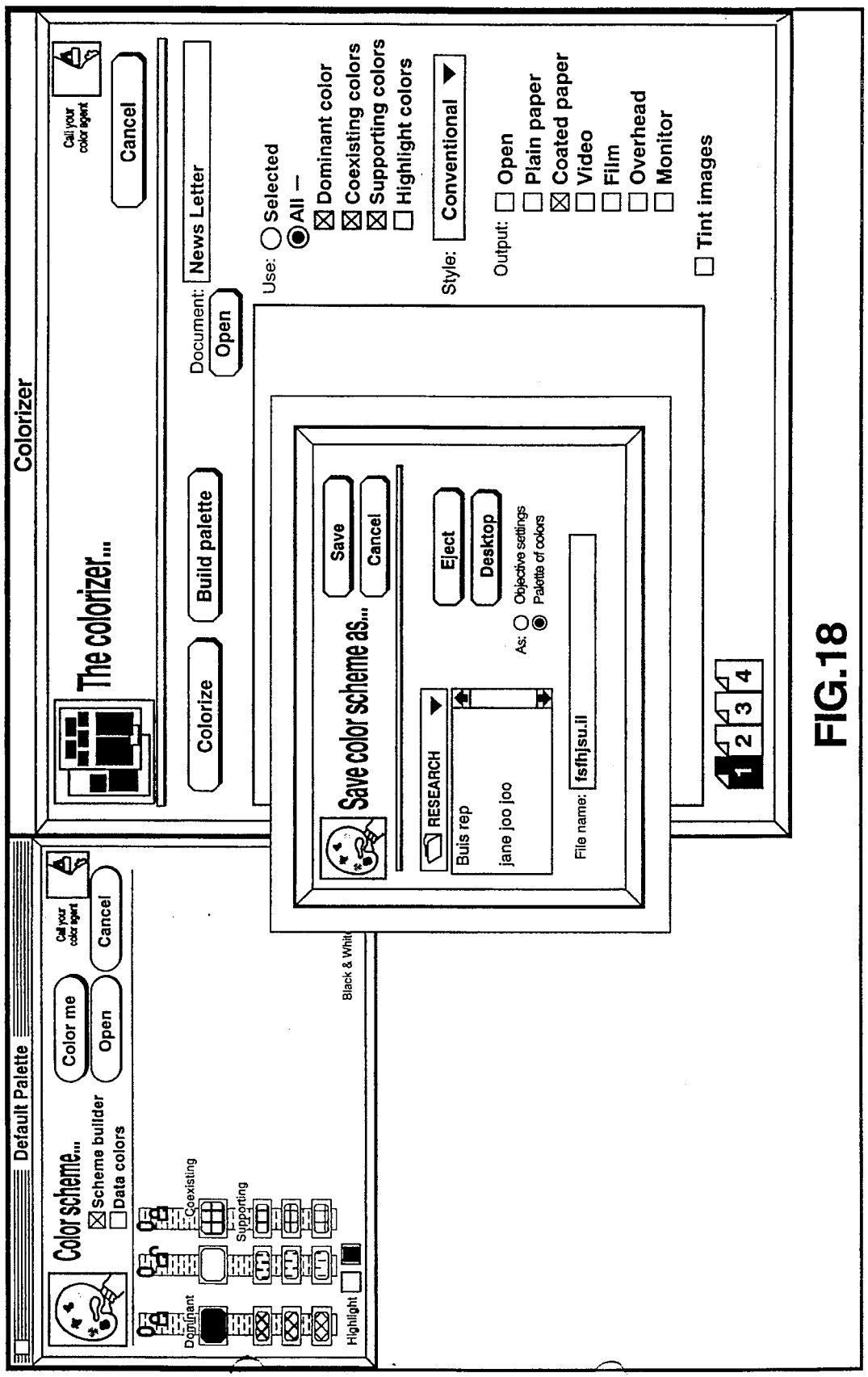
FIG. 18 is a representational view of a window display illustrating the manner in which the foregoing representational views of window displays are overlaid in a windowing environment.

The description of the selection of each window is only an example of how to select and to colorize a document. Since the color scheme selection/colorizer program operates in a windowing environment, any window may be activated or deactivated as a user desires. For example, FIG. 18 illustrates the overlaying of windows wherein the window in the foreground in the display is operational.

- 26 -

Appendix 1.1

A FIRST METHOD FOR SELECTING A COLOR SCHEME

For each color impact objective, i.e., Happy, Angry, Romantic and Forceful, there will be defined three curves: Hue, Saturation and Brightness (HSB). Each of these curves is defined by a series of distinct points:

For hue: $n$ number of probability of relevance values can range *from some minimum to some maximum value*, for example, 0 to 1, 0 to 10, 0 to 100.

For saturation: $n$ number of saturation values will range *from some minimum to some maximum value*, for example, 0 to 1, 0 to 10, 0 to 100.

For brightness: $n$ number of brightness values will range *from some minimum to some maximum value*, for example: 0 to 1, 0 to 10, 0 to 100.

For each color impact objective, there exists a 3 x n table. A first index specifies the type of value: 1 = probability of relevance values, 2 = Saturation values and 3 = brightness values. A second index specifies the hue angle that is associated with the relevance, saturation and brightness values stored in those three locations. The second index ranges from 0 to n in increments of x degrees. For example, n = 0 to 359, x=1, there exists a 3X360 element array with values for every 1 degree of hue, or n = 0 to 79, x=4.5, there exists a 3X80 element array with values for every 4.5 degrees of hue. Optimally, there should be a value for every whole degree in the hue range, so $n$ will be 360: 0 to 359, in increments of 1 degree. Alternatively, the 3 x n table could be expanded to a 4 x n table by HSB values and relevance values. The first index of the 4 x n table specifies the type of value: 1 = hue values, 2 = probability of relevance values, 3 = saturation values and 4 - brightness values.

Each color impact objective category, i.e., Emotion, Style, Message, may have a single weight value to be used in calculating composite saturation and brightness curves and, in addition, the weighting may be used to calculate composite hue. It may also be desirable to provide weighting for not only the objective categories, but also the individual objectives in order to further define desired colors.

- 27 -

To Calculate Appropriate Colors With Optional Weighting:

1) At each hue angle, add the hue relevance values from all of the objective curves selected.

For each objective selected x=0, x++ to number objectives selected
{
    For each defined hue angle n=0, n++ to number of hue values
    {
        solution relevance[n] =+ objective hues[x,n] * weight [x]
    }
    average_factor =+ weight[x]
}

2) Obtain the average by dividing.

For each defined hue angle n=0, n++ to number of hue values
{
    solution relevance[n] = solution hues[n]/ average_factor
}

3) Find the Maximum solution relevance value.

4) A "standard deviation" value is applied to the solution hue curve. The standard deviation is an interval which can be used to locate hue picks along the solution hue curve. For example, using the standard deviation, start at the maximum value from step 3 and move along the hue curve taking values at each standard deviation. This standard deviation could be determined either by statistical analysis of the solution hues curve, or could be hard coded, i.e., some predetermined number of hue degrees, for example, the average number of degrees needed to perceive a color difference. As an alternative to this, maximum relevance values can be picked directly from the actual array of solution relevance values.

5) Using the hues picked in step 4, each hue is sorted into an order of their probability of relevance value.

6) Depending on the requested palette size and the user's settings for the desired relationship between the colors (harmonious, dissonant, etc.), the dominant and coexisting colors from the sorted list are extracted. These colors will be referred to as the major colors, i.e., major colors = dominant + coexistent.

For the major colors, colors are selected which have the highest possible probability of relevance values. In view of this, the selection is limited to the part of the list which has the greatest relevance values. The limit for choosing relevance values may be preset to a value like 50% or higher, but in order to ensure that there are enough colors to choose from, it may be desirable to calculate a limit based on the list's distribution.

The first color in the sorted list, which has the highest relevance value, is selected to be the dominant color. Using the artist's color wheel theory of color relationships, find the next color in the list that fulfills the relationship rule set by the user, and so on, until all the needed colors are chosen.

The artist's color wheel theory is the basic technique that artists use to organize color mixing and managing of color relationships. The color wheel is composed of the three pigment primaries: red, yellow and blue organized in an equilateral triangular relationship. A circle is formed around these colors composed of the mixture of two adjoining colors, i.e., between red and yellow we have continuous shades of red to orange to yellow. Any two colors that are opposite each other on this wheel are conflicting, a composition of the two will be dissonant, these are called complementary colors. Likewise, a triad of colors taken at equal distances around the wheel (120° apart) will tend to be harmonious and will go well together.

For example, using the color wheel theory to select 5 colors in a harmonious relationship assuming the dominant color is hue angle 0° in the stored list, the remaining four colors are selected using equal triad around the color wheel. Locate 1 or 2 colors "close to", i.e., within a small number of standard deviations to hue angle 120° and 1 or 2 colors around hue angle 240°, and/or possibly one other color around hue angle 0° to make the 5 major colors in this palette.

The list is traversed until the first hue with an acceptable high relevance value is located which has a hue angle "close to" 0°, 120° or 240°, for example, hue angle 244°. Continue locating the next hue that is "close to" 0°, 120° or 240°, for example, hue 352°. Now no further colors are needed around hue angle 0° so the search can be limited to find only colors around 120° and 240°. If the only

- 29 - colors remaining are around 120° and 240° which have a very low relevance to the objectives, then other colors must be selected. One approach would be to move the triad targets closer to the first color picked, the dominant color, and search the list again. Therefore, beginning at the top of the list, now locate colors close to, for example, hue angles 105° and 255°. This approach is repeated until 5 hues have been selected.

Note 1: Since the target color relationship is harmonious, avoid looking for and picking colors that are close to being opposite on the color wheel to each other, i.e., colors having a dissonant relationship.

Note 2: Since HSB (Hue, Saturation and Brightness) space is being used, the actual angles used (0°, 120° and 240°) have to be adjusted to shift the actual positioning of hues in HSB to something closer to the artist's pigment-based color wheel.

Similar schemes can be developed for the other color relationships, dissonant colors, no relationship, etc.

7) Now for each of the major color hues selected in step 6, add up the weighted saturation values from the appropriate objective curves/tables:

For each objective selected x=0, x++ to number selected
{
    For each picked hue angle n=0, n++ to number of hue values
    {
        solution saturation[n]=+)object saturation [x,n]*weight[x])
    }
    average factor =+ weight[x]
}

8) Obtain the weighted average by dividing:

For each picked hue angle n+0, n++ to number of hue values
{
    solution saturation[n]=solution saturation [n]/average factor
}

9) Repeat steps 7 and 8 for the brightness values. As an alternative to steps 7, 8 and 9 the values for saturation and brightness can be taken directly from a single objective curve/table, the one that is

- 30 - deemed to be the most relevant, or has the highest weight.

10) The hue, saturation and brightness are now defined for the palettes' dominant and coexisting colors.

11) To calculate the supporting colors, select each major color (dominant and coexisting) in turn and create n number of supporting colors by starting with that major color and varying the saturation, brightness and perhaps even very slightly the hue. Randomly choose a saturation factor, a brightness factor and a hue factor and multiply them to the major colors HSB components to get a supporting color; doing this for each supporting color to be created. The supporting colors should differ perceptually from each other by saturation and/or brightness but maintain close proximity to the major colors hue. Generally speaking, in HSB color coordinate space, the supporting colors should be less saturated and darker than their major color.

```
For n=1, n++ to number of major colors
{
      For x=1, n++ to number of supporting colors
      {
          supporting hue[n,x]=solution hue[n]*RANDOM
            (hue factor range)
          supporting sat[n,x]=solution sat[n]*RANDOM
            (sat factor range)
          supporting bri[n,x]=solution bri[n]*RANDOM
            (bri factor range)
      }
}
```

Another approach could be to assign hard-coded factors for saturation, brightness and hue shifts that are applied to the major color for each level of supporting color to be calculated:

```
For n=1, n++ to number of major colors
{
      For x=1, n++ to number of supporting colors
      {
          supporting hue[n,x]=solution hue[n]*
            supporting hue factor[x]
          supporting sat[n,x]=solution sat[n]*
            supporting sat factor[x]
          supporting bri[n,x]=solution bri[n]*
            supporting bri factor[x]
      }
}
```

- 31 -

Appendix 1.2

A SECOND METHOD FOR SELECTING A COLOR SCHEME

Like the first method, for each color impact objective there is a 3 x n table which divides the hue angle range of 0° to 360° into "n" groups, such as 36 groups of 10° each. For each of the n groups in the 3 x n table, the 3 entries are: 1 = relevance, 2 = saturation value, and 3 = brightness value.

To Calculate Appropriate Colors:

1) At each hue angle, and for each category for which an objective has been selected, choose the color (hue, saturation, and value) that has the largest relevance; record this color as the solution color along with the relevance itself. That is:

```
For each defined hue angle n=0, n++ to number of hue
values
    {   solution_relevance [n] = -1
        solution_hue [n] = n
        if no objective categories are selected, then
            {   solution [n] saturation = default_saturation
                solution [n] value = default_value
            }
        otherwise
            {   for each objective category x=0, x++ to
                number of objective categories
                    {   if objective category has a selected
                        objective then
                        {   if objective[x] relevance [n] >
                            solution_relevance[n] then
                            {   solution_relevance[n] =
                                    objective[x] relevance[n]
                                solution_saturation[n] =
                                    objective[x] saturation[n]
                                solution_value [n] =
                                    objective[x] saturation [n]
                            }
                        }
                    }
            }
    }
```

2) Find the Maximum solution relevance value.

3) A "standard deviation" value is applied to the solution hue curve. The standard deviation is an interval which can be used to locate hue picks along the solution hue curve. For example, using the

- 32 - standard deviation, start at the maximum value from step 2 and move along the hue curve taking values at each standard deviation. This standard deviation could be determined either by statistical analysis of the solution hues curve, or could be hard coded, i.e., some predetermined number of hue degrees, for example, the average number of degrees needed to perceive a color difference. As an alternative to this, maximum relevance values can be picked directly from the actual array of solution relevance values.

4) Using the hues picked in step 3, each hue is sorted into an order of their probability of relevance value.

5) Depending on the requested palette size and the user's settings for the desired relationship between the colors (harmonious, dissonant, etc.), the dominant and coexisting colors from the sorted list are extracted. These colors will be referred to as the major colors, i.e., major colors = dominant + coexistent.

For the major colors, colors are selected which have the highest possible probability of relevance values. In view of this, the selection is limited to the part of the list which has the greatest relevance values. The limit for choosing relevance values may be preset to a value like 50% or higher, but in order to ensure that there are enough colors to choose from, it may be desirable to calculate a limit based on the list's distribution.

The first color in the sorted list, which has the highest relevance value, is selected to be the dominant color. Using the artist's color wheel theory of color relationships, find the next color in the list that fulfills the relationship rule set by the user, and so on, until all the needed colors are chosen.

The artist's color wheel theory is the basic technique that artists use to organize color mixing and managing of color relationships. The color wheel is composed of the three pigment primaries: red, yellow and blue organized in an equilateral triangular relationship. A circle is formed around these colors composed of the mixture of two adjoining colors, i.e., between red and yellow we have continuous shades of red to orange to yellow. Any two colors that are opposite each other on this wheel are conflicting, a composition of the two will be dissonant, these are called complementary colors. Likewise, a triad of colors taken at equal distances around the wheel (120° apart) will tend to be harmonious and will go well together.

For example, using the color wheel theory to select 5 colors in a harmonious relationship assuming the dominant color is hue angle 0° in the stored list, the remaining four colors are selected using equal triad around the color wheel. Locate 1 or 2 colors "close to", i.e., within a small number of standard deviations to hue angle 120° and 1 or 2 colors around hue angle 240°, and/or possibly one other color around hue angle 0° to make the 5 major colors in this palette.

The list is traversed until the first hue with an acceptable high relevance value is located which has a hue angle "close to" 0°, 120° or 240°, for example, hue angle 244°. Continue locating the next hue that is "close to" 0°, 120° or 240°, for example, hue 352°. Now no further colors are needed around hue angle 0° so the search can be limited to find only colors around 120° and 240°. If the only colors remaining are around 120° and 240° which have a very low relevance to the objectives, then other colors must be selected. One approach would be to move the triad targets closer to the first color picked, the dominant color, and search the list again. Therefore, beginning at the top of the list, now locate colors close to, for example, hue angles 105° and 255°. This approach is repeated until 5 hues have been selected.

Note 1: Since the target color relationship is harmonious, avoid looking for and picking colors that are close to being opposite on the color wheel to each other, i.e., colors having a dissonant relationship.

Note 2: Since HSB (Hue, Saturation and Brightness) space is being used, the actual angles used (0°, 120° and 240°) have to be adjusted to shift the actual positioning of hues in HSB to something closer to the artist's pigment-based color wheel.

Similar schemes can be developed for the other color relationships, dissonant colors, no relationship, etc.

6) Now for each of the major color hues selected in step (5), use the weighted saturation values from step (1).

7) Repeat step (6) for the brightness values. In this manner, the values for saturation and brightness are taken from the saturation and brightness tables in correspondence to the selected hue angle.

8) The hue, saturation and brightness are now defined for the palettes' dominant and coexisting colors.

- 34 -

9) To calculate the supporting colors, select each major color (dominant and coexisting) in turn and create n number of supporting colors by starting with that major color and varying the saturation, brightness and perhaps even very slightly the hue. Randomly choose a saturation factor, a brightness factor and a hue factor and multiply them to the major colors HSB components to get a supporting color; doing this for each supporting color to be created. The supporting colors should differ perceptually from each other by saturation and/or brightness but maintain close proximity to the major colors hue. Generally speaking, in HSB color coordinate space, the supporting colors should be less saturated and darker than their major color.

```
For n=1, n++ to number of major colors
{
    For x=1, n++ to number of supporting colors
    {
        supporting hue[n,x]=solution hue[n]*RANDOM
          (hue factor range)
        supporting sat[n,x]=solution sat[n]*RANDOM
          (sat factor range)
        supporting bri[n,x]=solution bri[n]*RANDOM
          (bri factor range)
    }
}
```

Another approach could be to assign hard-coded factors for saturation, brightness and hue shifts that are applied to the major color for each level of supporting color to be calculated:

```
For n=1, n++ to number of major colors
{
    For x=1, n++ to number of supporting colors
    {
        supporting hue[n,x]=solution hue[n]*
          supporting hue factor[x]
        supporting sat[n,x]=solution sat[n]*
          supporting sat factor[x]
        supporting bri[n,x]=solution bri[n]*
          supporting bri factor[x]
    }
}
```

- 35 -

Appendix 1.3

METHOD FOR SELECTING HIGHLIGHT AND DATA COLORS

HIGHLIGHT COLORS

Using the Hue, Saturation and Brightness of the dominant color.

The desired highlight color is selected at 180° hue from the dominant color:

Hcolor.Hue = (Dcolor.Hue + 180) MOD 360;

The desired saturation for the highlight color is set to:

Hcolor.Sat = Dcolor.Sat + (100 - Dcolor.Sat)/2;

The desired brightness for the highlight color is set to 100%:

Hcolor.Bri = 100;

If more highlight colors are desired, then two colors are selected at +-90° from the first highlight color. So, if Hcolor1 is the first highlight color calculated above:

Hcolor2.Hue = (Hcolor1.Hue + 90) MOD 360;
    Hcolor2.Sat = Hcolor1.Sat;
    Hcolor2.Bri = 100;

Hcolor3.Hue = (Hcolor1.Hue = 270) MOD 360;
    Hcolor3.Sat = Hcolor1.Sat;
    Hcolor3.Bri - 100

DATA COLORS

METHOD 1:

Divide the color hue space into $n + 1$ segments where $n$ is the number of desired data colors:

interval = 360/(numDatacolors + 1);

Using the Hue, Saturation and Brightness of the palette dominant color, the saturation and brightness for the data colors is set to (Dcolor is the dominant color):

- 36 -

```
    DatacolorSat = Dcolor.Sat + (100 -
      Dcolor.Sat)/2
    DatacolorBri = Dcolor.Bri + (100 -
      Dcolor.Bri)/2
```

To calculate n data colors (Dcolor is the dominant color):

```
    Datacolor.Hue[0] = Dcolor.hue;
    Datacolor.Sat[0] = DatacolorSat;
    Datacolor.Bri[0] = DatacolorBri;
    For n+1; number of data colors-1; n++
    {
        Datacolor.Hue[n] = (Datacolor.Hue[n-1]
          + interval)MOD 360;
        Datacolor.Sat[n] - DatacolorSat;
        Datacolor.Bri[n] = DatacolorBri;
    }
```

METHOD 2:

Use perceptual difference intervals between data color hues. Using the Hue, Saturation and Brightness of the dominant color. Where Dcolor is the dominant color:

```
    ColorHues    PerHues[];

StartHue = Dcolor.hue;
    Perhues = GET_PERCEPT_HUES(StartHue,
      numDatacolors);
```

The saturation and brightness for the data colors is set to:

```
    DatacolorSat = Dcolor.Sat + (100 -
      Dcolor.Sat)/2;
    DatacolorBri = Dcolor.Bri + (100 -
      Dcolor.Bri)/2;
```

To calculate n data colors;

```
    For n=0; number of data colors; n++
    {
        Datacolor.Hue[n] = PerHue[n];
        Datacolor.Sat[n] = DatacolorSat;
        Datacolor.Bri[n] = DatacolorBri;
    }
```

What is claimed is:

1. A computer-implemented method for selecting a color scheme, comprising the steps of:
   retrieving user-selectable color-scheme impact objectives, each of which specify a relevance relation to at least one color and which are used to automatically generate a color scheme for colorizing a document, said color scheme comprising a dominant color; and
   accessing a computerized color knowledge-base system to generate a color scheme which includes the dominant color in the color scheme based on selected color impact objectives.

2. A method according to claim 1, further comprising the step of displaying the dominant color of the color scheme.

3. A method according to claim 1, wherein the accessing step comprises the step of combining the selected color-scheme impact objectives and determining the dominant color from the knowledge base and generating dominant supporting colors in accordance with a predetermined color association to the dominant color.

4. A method according to claim 3, wherein the accessing step further includes combining the selected color-scheme impact objectives and determining the coexisting color and generating a coexisting supporting color in accordance with a predetermined association to the coexisting color.

5. A method according to claim 4, further comprising the step of adjusting the color of any of the dominant color, dominant supporting color, coexisting color, and coexisting supporting color.

6. A method according to claim 1, wherein the color scheme includes at least the dominant color and dominant supporting colors.

7. A method according to claim 1, wherein the color scheme includes the dominant color, coexisting colors, and coexisting supporting colors.

8. A method for colorizing a document using a computer-generated color scheme, comprising the steps of:
   retrieving a document;
   selecting a page of the document to be colorized;
   simultaneously colorizing a plurality of thumbnail reproductions of the selected page, the plurality of thumbnail reproductions being automatically and variably colorized using combinations of colors from the computer-generated color scheme; and
   displaying, in accordance with a user selection, one of the plurality of colorized thumbnail reproductions,
   wherein the step of simultaneously colorizing a plurality of thumbnail reproductions of the selected page includes automatically varying a combination of the selected color scheme such that the same varied color combination is not repeated for each of the plurality of thumbnail reproductions.

9. A method according to claim 8, wherein the step of colorizing a plurality of thumbnail reproductions of a selected page is repeated for each document page within the document.

10. A method of skewing color schemes selected by a computer-implemented program, the method comprising the steps of:
    maintaining a log of color schemes previously selected and applied by a user;
    determining preference information of commonly used colors based on previously selected color schemes and their use; and
    developing a color selection and skew factors based on the preference information.

11. A method according to claim 10, further comprising the step of applying the color skew factor to the computer-implemented color scheme selection in order to obtain a skewed color scheme selection.

12. A method according to claim 10, further comprising the step of applying the skewed color scheme to automatically colorize a document.

13. A method according to claim 10, further comprising the step of applying the color skew factor to a colorized document in order to modify the application of the colors to the colorized document.

14. In a computer system for colorizing documents, a document-colorizing method comprising the steps of:
    retrieving user-selectable color-scheme impact objectives which are used to generate a color scheme for colorizing a document;
    accessing a computerized color knowledge-base system in accordance with the selected color-scheme impact objectives in order to generate the color scheme;
    automatically generating the color scheme based on the selected color-scheme impact objectives, said generated color scheme comprising a dominant color, at least one coexisting color and at least one supporting color;
    displaying the color scheme;
    retrieving a document file; and
    colorizing a plurality of thumbnail reproductions of the retrieved document using the selected color scheme, the plurality of thumbnail reproductions of the document being variably colorized with combinations of colors from the displayed color scheme.

15. A method according to claim 14, further comprising the steps of selecting, in accordance with a user's designation, one of the plurality of the colorized thumbnail reproductions and re-displaying the designated colorized thumbnail reproduction.

16. A computer-implemented colorizing apparatus for selecting a color scheme, comprising:
    menu display means for displaying a menu of user-selectable color-scheme impact objectives which are used to specify a color scheme;
    access means for automatically accessing a computerized color knowledge-base system in accordance with the selected color-scheme impact objectives to automatically generate the color scheme; and
    color scheme display means for displaying the selected color scheme, wherein the generated color scheme comprises a dominant color, at least one coexisting color and at least one supporting color.

17. An apparatus for colorizing a document with a computer-generated color scheme, comprising:
    retrieval means for retrieving a document;
    selection means for selecting a page of the document to be colorized;
    colorizer means for colorizing a plurality of thumbnail reproductions of the selected page, the plurality of thumbnail reproductions being automatically and variably colorized with combinations of colors from the selected color scheme; and
    display means for displaying, in accordance with a user selection, one of the plurality of colorized thumbnail reproductions,
    wherein the colorizer means varies the combination of colors of the color scheme for each thumbnail reproduction such that the same varied color combination is not repeated for each of the plurality of thumbnail reproductions.

18. An apparatus for skewing color schemes selected by a computer-implemented program, the apparatus comprising:

a color diary for maintaining a log of a plurality of color schemes previously selected by a user;

determining means for determining preference information based on previously selected and applied colors and based on previously selected color schemes and color adjusting means for developing a color skew factor based on the preference information.

19. An apparatus according to claim 18, further comprising a color skewing means for applying the color skew factor to a computer-implemented color scheme in order to obtain a skewed color scheme selection.

20. An apparatus according to claim 18, further comprising a colorizer means for colorizing a document with the skewed color scheme.

21. An apparatus according to claim 18, wherein the colorizing means applies the skewed color schemes to a colorized document in order to modify the colors in the colorized document.

22. In a computer system for colorizing documents, a document-colorizing apparatus comprising:

menu display means for displaying a menu of user-selectable color-scheme objectives used to specify a color scheme;

access means for automatically accessing a computerized color knowledge-base system in accordance with the selected color-scheme impact objectives to automatically generate the color scheme, said generated color scheme comprising a dominant color, at least one coexisting color and at least one supporting color;

color-scheme display means for displaying the color scheme;

retrieval means for retrieving a document;

selection means for selecting a page of the document to be colorized;

colorizer means for colorizing a plurality of thumbnail reproductions of the selected page, the plurality of thumbnail reproductions being variably colorized with combinations of colors from the displayed color scheme; and display means for displaying, in accordance with a user's selection, one of the plurality of reproduced colorized pages.

23. A computer-implemented method for automatically generating a color scheme based on input color-scheme impact objectives, the method comprising the steps of:

accessing a computerized knowledge-base system in accordance with the input color-scheme impact objectives;

determining a dominant color of the color scheme using the computerized knowledge-base system;

automatically generating a dominant supporting color of the color scheme having a predetermined relationship to the dominant color;

automatically generating a coexisting color of the color scheme having a predetermined relationship to the dominant color different from the predetermined relationship of the dominant supporting color; and automatically generating coexisting supporting colors of the color scheme having a predetermined relationship to the coexisting color.

24. A method according to claim 23, further comprising the step of displaying the dominant color, dominant supporting color, coexisting color, and coexisting supporting color in a color palette.

25. A method for colorizing a document using a plurality of computer-generated selected color schemes, the method comprising the steps of:

displaying a plurality of computer-generated color schemes;

selecting a document to be colorized;

automatically colorizing a plurality of thumbnail reproductions of the selected document using each of the plurality of computer-generated color schemes; and displaying each of the colorized plurality of thumbnail reproductions.

26. A method according to claim 25, wherein each of the computer-generated color schemes is based on input color impact objectives.

27. A method for modifying a color scheme generated by a computer in accordance with input color impact objectives, the method comprising the steps of:

selecting a plurality of different colors in the color scheme which are to be modified;

linking the selected plurality of different colors to be modified; and simultaneously modifying the linked plurality of colors in the color scheme so as to modify each of the linked colors equally.

28. A method according to claim 27, wherein, in the step of modifying, hue, saturation, blackness, whiteness, and warmth of each of the plurality of colors can be altered.

29. A method according to claim 28, wherein the step of modifying includes the step of linking at least two colors of the color scheme which are to be modified so that when one of the linked colors is modified, all of the linked colors are similarly modified in such a way as to maintain a constant color relationship.

30. A document-colorizing apparatus for colorizing documents using a color scheme based on user-selected impact color-scheme objectives, comprising:

input means for inputting at least one color-scheme impact objective;

memory means for storing process steps, a color knowledge base for automatically generating the color scheme, and color-scheme impact objectives;

process means for a) automatically generating the color scheme, in accordance with the process steps stored in said memory means, which includes retrieving user-selectable color-scheme impact objectives which are used to define a color scheme, 2) accessing the color knowledge base in accordance with the retrieved color-scheme impact objectives, 3) selecting the color scheme from the color knowledge base, 4) displaying the color scheme, and 5) colorizing a plurality of thumbnail reproductions of a document to be colored using the selected color scheme.

31. An apparatus according to claim 30, wherein the input means is operative to select, in accordance with a user's designation, one of the plurality of colorized thumbnail reproductions, and wherein the process means re-displays the designated colorized thumbnail reproduction as a full-size colorized document so as to allow further color modifications.

\* \* \* \* \*

UNITED STATES PATENT AND TRADEMARK OFFICE
CERTIFICATE OF CORRECTION

PATENT NO. : 5,615,320
DATED : March 25, 1997
INVENTOR(S) : Laurence A. Lavendel.

It is certified that error appears in the above-indentified patent and that said Letters Patent is hereby corrected as shown below:

<u>COLUMN 4</u>:

Line 60, "in" (first occurrence) should read --In--.

<u>COLUMN 37</u>:

Line 8, "schemes and" should read --schemes; and--.

<u>COLUMN 38</u>:

Line 47, "a)" should read --1)--.

Signed and Sealed this

Twenty-first Day of October 1997

Attest:

BRUCE LEHMAN

*Attesting Officer*   *Commissioner of Patents and Trademarks*